(12) United States Patent
Drury et al.

(10) Patent No.: US 12,236,493 B2
(45) Date of Patent: Feb. 25, 2025

(54) SYSTEMS AND METHODS OF ACCESS CONTROL AND SYSTEM INTEGRATION

(71) Applicant: Xero Limited, Wellington (NZ)

(72) Inventors: Rodney Kenneth Drury, Havelock North (NZ); Matthew John Vickers, Wellington (NZ)

(73) Assignee: Xero Limited, Te Aro Wellington (NZ)

( * ) Notice: Subject to any disclaimer, the term of this patent is extended or adjusted under 35 U.S.C. 154(b) by 0 days.

(21) Appl. No.: 18/366,499

(22) Filed: Aug. 7, 2023

(65) Prior Publication Data

US 2023/0385953 A1    Nov. 30, 2023

Related U.S. Application Data

(63) Continuation of application No. 17/306,023, filed on May 3, 2021, now Pat. No. 11,783,433, which is a
(Continued)

(51) Int. Cl.
*G06Q 40/12* (2023.01)
*G06Q 20/02* (2012.01)
(Continued)

(52) U.S. Cl.
CPC .......... *G06Q 40/128* (2013.12); *G06Q 20/027* (2013.01); *G06Q 20/10* (2013.01);
(Continued)

(58) Field of Classification Search
CPC .... G06Q 40/128; G06Q 20/12; G06Q 20/027; G06Q 20/10; G06Q 20/108; G06Q 20/227; G06Q 20/40; G06Q 20/4037
See application file for complete search history.

(56) References Cited

U.S. PATENT DOCUMENTS 5,978,780 A    11/1999    Watson
6,038,551 A    3/2000    Barlow et al.
(Continued)

FOREIGN PATENT DOCUMENTS

CA    2925483 C    10/2018
CN    103136663 A    6/2013
(Continued)

OTHER PUBLICATIONS

"U.S. Appl. No. 14/494,476, Examiner Interview Summary mailed Mar. 23, 2015", 3 pgs.
(Continued)

*Primary Examiner* — Paul Danneman
(74) *Attorney, Agent, or Firm* — Schwegman Lundberg & Woessner, P.A.

(57) ABSTRACT

Automated provisioning, according to one example embodiment, enables a mutual customer to establish an intelligent and automated connection between an accounting software system and their financial institution. For example, this might be achieved by allowing a financial institution customer to make feeds from their bank accounts available to the accounting software system within financial internet software (e.g., hosted and operated by the customer's financial institution). Once a customer selects the bank account(s) they want to share with the accounting software system, they are passed along to the accounting software system to link the selected bank account with an account they have set up in the accounting software system.

20 Claims, 22 Drawing Sheets

Related U.S. Application Data continuation of application No. 16/204,394, filed on Nov. 29, 2018, now Pat. No. 11,030,706, which is a continuation of application No. 14/832,357, filed on Aug. 21, 2015, now Pat. No. 10,181,162, which is a continuation of application No. 14/494,476, filed on Sep. 23, 2014, now Pat. No. 9,117,208.

(60) Provisional application No. 61/881,314, filed on Sep. 23, 2013.

(51) Int. Cl.
  G06Q 20/10 (2012.01)
  G06Q 20/22 (2012.01)
  G06Q 20/40 (2012.01)

(52) U.S. Cl.
  CPC ......... *G06Q 20/108* (2013.01); *G06Q 20/227* (2013.01); *G06Q 20/40* (2013.01); *G06Q 20/4037* (2013.01); *G06Q 40/12* (2013.12)

(56) References Cited

U.S. PATENT DOCUMENTS

| | | |
|---|---|---|
| 7,120,597 B1 | 10/2006 | Knudtzon |
| 8,121,913 B2 | 2/2012 | Bracken et al. |
| 8,442,881 B2 | 5/2013 | Patel |
| 8,473,377 B2 | 6/2013 | Smith et al. |
| 8,560,447 B1 | 10/2013 | Hinghole et al. |
| 8,706,627 B2 * | 4/2014 | Shore ............... G06F 21/10 705/41 |
| 8,756,131 B1 | 6/2014 | Pariante et al. |
| 9,117,208 B2 | 8/2015 | Drury et al. |
| 10,181,162 B2 | 1/2019 | Drury et al. |
| 10,915,875 B1 * | 2/2021 | Jawharker ......... G06Q 30/0633 |
| 11,030,706 B2 | 6/2021 | Drury et al. |
| 11,783,433 B2 | 10/2023 | Drury et al. |
| 2002/0032625 A1 | 3/2002 | Brown |
| 2003/0105688 A1 | 6/2003 | Brown et al. |
| 2003/0149662 A1 | 8/2003 | Shore |
| 2005/0125321 A1 | 6/2005 | Gerstner et al. |
| 2006/0206427 A1 | 9/2006 | Love et al. |
| 2008/0255970 A1 | 3/2008 | Ferguson |
| 2008/0313066 A1 | 12/2008 | Sholtis et al. |
| 2010/0106615 A1 | 4/2010 | Chadwick et al. |
| 2010/0125513 A1 | 5/2010 | Chung et al. |
| 2010/0274687 A1 | 10/2010 | Ghosh et al. |
| 2013/0232042 A1 | 9/2013 | Simpson et al. |
| 2015/0088707 A1 | 3/2015 | Drury et al. |
| 2015/0379646 A1 | 12/2015 | Drury et al. |
| 2019/0096005 A1 | 3/2019 | Drury et al. |
| 2021/0256625 A1 | 8/2021 | Drury et al. |
| 2023/0325940 A1 | 10/2023 | Drury et al. |
| 2023/0325941 A1 | 10/2023 | Drury et al. |

FOREIGN PATENT DOCUMENTS

| | | |
|---|---|---|
| CN | 103177388 A | 6/2013 |
| CN | 105849760 A | 8/2016 |
| WO | WO-2013136051 A1 | 9/2013 |
| WO | WO-2015042605 A1 | 3/2015 |

OTHER PUBLICATIONS

"U.S. Appl. No. 14/494,476, Final Office Action mailed Apr. 8, 2015", 12 pgs.

"U.S. Appl. No. 14/494,476, Non Final Office Action mailed Dec. 23, 2014", 10 pgs.

"U.S. Appl. No. 14/494,476, Notice of Allowance mailed Jul. 10, 2015", 16 pgs.

"U.S. Appl. No. 14/494,476, Response filed Mar. 23, 2015 to Non-Final Office Action Received Dec. 23, 2014", 11 pgs.

"U.S. Appl. No. 14/494,476, Response filed Jun. 10, 2015 to Final Office Action mailed Apr. 8, 2015", 10 pgs.

"U.S. Appl. No. 14/832,357, Examiner Interview Summary mailed Aug. 6, 2018", 3 pgs.

"U.S. Appl. No. 14/832,357, Final Office Action mailed Jun. 8, 2018", 11 pgs.

"U.S. Appl. No. 14/832,357, Non Final Office Action mailed Dec. 11, 2017", 13 pgs.

"U.S. Appl. No. 14/832,357, Notice of Allowance mailed Aug. 29, 2018", 12 pgs.

"U.S. Appl. No. 14/832,357, Preliminary Amendment filed Aug. 28, 2015", 8 pgs.

"U.S. Appl. No. 14/832,357, Response filed Mar. 14, 2018 to Non Final Office Action mailed Dec. 11, 2017", 13 pgs.

"U.S. Appl. No. 14/832,357, Response filed Aug. 8, 2018 to Final Office Action mailed Jun. 8, 2018", 14 pgs.

"U.S. Appl. No. 16/204,394, Examiner Interview Summary mailed Dec. 18, 2019", 3 pgs.

"U.S. Appl. No. 16/204,394, Final Office Action mailed Mar. 9, 2020", 12 pgs.

"U.S. Appl. No. 16/204,394, Final Office Action mailed Jun. 5, 2019", 12 pgs.

"U.S. Appl. No. 16/204,394, Non Final Office Action mailed Jan. 14, 2019", 10 pgs.

"U.S. Appl. No. 16/204,394, Non Final Office Action mailed Sep. 30, 2019", 13 pgs.

"U.S. Appl. No. 16/204,394, Notice of Allowance mailed Feb. 2, 2021", 10 pgs.

"U.S. Appl. No. 16/204,394, Notice of Allowance mailed Nov. 5, 2020", 11 pgs.

"U.S. Appl. No. 16/204,394, Pre-Appeal Brief filed Sep. 1, 2020", 5 pgs.

"U.S. Appl. No. 16/204,394, Response filed Jan. 29, 2020 to Non Final Office Action mailed Sep. 30, 2019", 11 pgs.

"U.S. Appl. No. 16/204,394, Response to Non Final Office Action mailed Jan. 14, 2019 filed Apr. 12, 2019", 12 pgs.

"U.S. Appl. No. 17/306,023, Non Final Office Action mailed Feb. 27, 2023", 7 pgs.

"U.S. Appl. No. 17/306,023, Notice of Allowance mailed Jun. 1, 2023", 9 pgs.

"U.S. Appl. No. 17/306,023, Response filed May 1, 2023 to Non Final Office Action mailed Feb. 27, 2023", 9 pgs.

"Australian Application Serial No. 2014324112, Voluntary Amendment filed Jun. 7, 2018", 12 pgs.

"Australian Application Serial No. 2015100409, Subsequent Examiners Report mailed Sep. 14, 2015", 5 pgs.

"Australian Application Serial No. 2015100410, Subsequent Examiners Report mailed Sep. 16, 2015", 5 pgs.

"Australian Application Serial No. 2015100411, Subsequent Examiners Report mailed Jun. 24, 2015", 7 pgs.

"Australian Application Serial No. 2015100411, Subsequent Examiners Report mailed Sep. 16, 2015", 5 pgs.

"Canadian Application Serial No. 2,925,483, Office Action mailed Jun. 20, 2017", 4 pgs.

"Canadian Application Serial No. 2,925,483, Response Filed Dec. 20, 2017 to Office Action mailed Jun. 20, 2017", 21 pgs.

"Chinese Application No. 201480058275.9, First Office Action issued Mar. 21, 2019", (w/ English Translation), (Mar. 21, 2019), 15 pgs.

"Chinese Application No. 201480058275.9, Notification to Grant Patent Right for Invention mailed Mar. 6, 2020", (Mar. 6, 2020), 3 pgs.

"Chinese Application No. 201480058275.9, Response filed Aug. 1, 2019", (w/ Concise Statement of Relevance), (Aug. 1, 2019), 5 pgs.

"Chinese Application No. 201480058275.9, Response mailed Nov. 5, 2019", (w/ Concise Statement of Relevance), (Nov. 5, 2019), 5 pgs.

"Chinese Application No. 201480058275.9, Second Office Action mailed Sep. 25, 2019", (w/ English Translation), (Sep. 25, 2019), 7 pgs.

"European Application Serial No. 14846077.7, Communication Pursuant to Article 94(3) EPC mailed Oct. 18, 2017", 4 pgs.

(56) References Cited

OTHER PUBLICATIONS

"European Application Serial No. 14846077.7, Extended European Search Report mailed Feb. 10, 2017", 10 pgs.
"European Application Serial No. 14846077.7, Response filed Apr. 19, 2018 to Communication Pursuant to Article 94(3) EPC mailed Oct. 18, 2017", 47 pgs.
"European Application Serial No. 14846077.7, Response Filed Aug. 29, 2017 to Extended European Search Report mailed Feb. 10, 2017", 23 pgs.
"European Application Serial No. 14846077.7, Response filed Dec. 1, 2016 to Communication pursuant to Rules 161(1) and 162 EPC mailed May 27, 2016", 19 pgs.
"European Application Serial No. 14846077.7, Summons to Attend Oral Proceedings mailed May 9, 2018", 12 pgs.
"International Application Serial No. PCT/US2014/057055, International Preliminary Report on Patentability mailed Apr. 7, 2016", 8 pgs.
"International Application Serial No. PCT/US2014/057055, International Search Report mailed Nov. 13, 2014", 4 pgs.
"International Application Serial No. PCT/US2014/057055, Written Opinion mailed Nov. 13, 2014", 7 pgs.
"Malaysian Application Serial No. PI 2016000514, Office Action mailed Apr. 27, 2016", 4 pgs.
"Oracle Fusion Accounting Hub", Oracle Data Sheets, [Online]. Retrieved from the Internet: <URL: http://www.oracle.com/us/products/applications/fusion/financials/fusion-acc-hub-ds-1558297.pdf>, (Accessed: Jan. 13, 2015), 5 pgs.
"Oracle Fusion Accounting Hub: Integration with Oracle Financial Solutions", An Oracle White Paper, [Online]. Retrieved from the Internet: <URL: http://www.oracle.com/us/products/applications/fusion/fusion-accounting-hub-304046.pdf>, (Nov. 2012), 14 pgs.
"Singaporean Application Serial No. 11201602154Y, Written Opinion dated Jan. 16, 2017", 7 pgs.
Barmouta, Alexander, et al., "Gridbank: A Grid Accounting Services Architecture (GASA) for Distributed Systems Sharing and Integration", IEEE: International Proceedings of Parallel and Distributed Processing Symposium., (Apr. 2003), 8 pgs.
Drury, Rodney Kenneth, "U.S. Appl. No. 14/494,476 Non-Final Office Action Received 12/23/204", 10 pgs.
Jackson, Duane, "Bank feeds—You know they're dodgy, right?", [Online]. Retrieved from the Internet: <URL: http://www.accountingweb.co.uk/group-thread/bank-feeds-you-know-theyre-dodgy-right>, (Feb. 28, 2012), 13 pgs.
Null, Christopher, "Choose the best bank for your tech-savvy business: 8 banks compared", [Online]. Retrieved from the Internet: <URL: http://www.pcworld.com/article/244286/choose_the_best_bank_for_your_tech_savvy_business_8_banks_compared.html>, (Nov. 20, 2011), 5 pgs.
U.S. Appl. No. 61/881,314, filed Sep. 23, 2013, Systems and Methods of Access Control and System Integration.
U.S. Appl. No. 14/494,476 U.S. Pat. No. 9,117,208, filed Sep. 23, 2014, Systems and Methods of Access Control and System Integration.
U.S. Appl. No. 14/832,357 U.S. Pat. No. 10,181,162, filed Aug. 21, 2015, Systems and Methods of Access Control and System Integration.
U.S. Appl. No. 16/204,394 U.S. Pat. No. 11,030,706, filed Nov. 29, 2018, Systems and Methods of Access Control and System Integration.
U.S. Appl. No. 17/306,023, filed May 3, 2021, Systems and Methods of Access Control and System Integration.
U.S. Appl. No. 18/335,625, filed Jun. 15, 2023, Systems and Methods of Access Control and System Integration.
U.S. Appl. No. 18/335,645, filed Jun. 15, 2023, Systems and Methods of Access Control and System Integration.
"U.S. Appl. No. 18/335,625, Final Office Action mailed Aug. 20, 2024", 8 pgs.
"U.S. Appl. No. 18/335,625, Non Final Office Action mailed Apr. 24, 2024", 7 pgs.
"U.S. Appl. No. 18/335,625, Response filed Jul. 23, 2024 to Non Final Office Action mailed Apr. 24, 2024", 10 pgs.
"U.S. Appl. No. 18/335,645, Final Office Action mailed Aug. 26, 2024", 11 pgs.
"U.S. Appl. No. 18/335,645, Non Final Office Action mailed Apr. 29, 2024", 16 pgs.
"U.S. Appl. No. 18/335,645, Response filed Jul. 29, 2024 to Non Final Office Action mailed Apr. 29, 2024", 13 pgs.

\* cited by examiner

SYSTEMS AND METHODS OF ACCESS CONTROL AND SYSTEM INTEGRATION

PRIORITY CLAIM

The application is a continuation of U.S. application Ser. No. 17/306,023, filed May 3, 2021, and published as U.S. 2021-0256625 on Aug. 19, 2021, which is a continuation of U.S. application Ser. No. 16/204,394, filed Nov. 29, 2018, and published as U.S. 2019-0096005 on Mar. 28, 2019, which is a continuation of U.S. application Ser. No. 14/832,357, filed Aug. 21, 2015 and published as U.S. 2015-0379646 on Dec. 31, 2015, which is a continuation of U.S. application Ser. No. 14/494,476, filed Sep. 23, 2014, and published as U.S. 2015-0088707 on Mar. 26, 2015, which claims priority to U.S. Patent Application No. 61/881,314, filed Sep. 23, 2013, entitled "Systems and Methods of Access Control and System Integration," which applications are incorporated herein by reference in their entirety.

TECHNICAL FIELD

The present disclosure generally relates to facilitating intelligent and automated access between computer systems and, more specifically, to systems and methods for access control and system integration.

BACKGROUND

Accounting systems are critical business tools, widely used by businesses around the globe, for the purpose of tracking, storing, and processing important financial data. However, the existing accounting systems contain many glaring inefficiencies. Users of many traditional accounting systems import data from their financial accounts by manually entering data into the accounting system. Alternatively, some users can download data from the financial institution holding the financial account and then manually upload that data into the accounting system.

Users of many traditional accounting systems pay bills by manually interacting with their financial accounts or writing checks. After the payment is made, users manually update their accounting data to show that the bills are paid and that the balance in the account from which payment is drawn is reduced. Given the widespread use of accounting systems, there is a strong need for innovative systems and access methods that create a more intelligent, automated, and integrated system.

BRIEF DESCRIPTION OF THE DRAWINGS

Some embodiments are illustrated by way of example and not of limitation in the figures of the accompanying drawings.

DETAILED DESCRIPTION

As noted above, there is a strong need for innovative systems and access methods that create a more intelligent, automated, and integrated system. Example systems and methods to facilitate access between disparate computer systems are described. In the following description, for purposes of explanation, numerous specific details are set forth in order to provide a thorough understanding of example embodiments. It will be evident, however, to one skilled in the art, that the present technology may be practiced without these specific details.

The example technology is described herein within the context of providing an accounting computer system with access to a third-party financial computer system. It will also be appreciated that the described technology may be deployed in other environments and for a multitude of other purposes.

One example embodiment described herein enables access and the provision of services between a first computer system (e.g., hosting online accounting software that is made available to small business customers) and a second computer system (e.g., hosting financial software).

The online accounting software may provide small business customers with the ability to manage their accounts within the cloud, by accessing a secure online website and reviewing and updating their data. Such customers can invite trusted advisors—e.g., accountants, bookkeepers, their bank manager, and/or their business partner—into their accounts also. Because the data is in the cloud, and is shared between a group of trusted individuals, it provides a single ledger: one single set of accounts that can be accessed by the business owners and their accountants. Accordingly, once the accountant makes an adjustment or publishes a report, the business owner can access it. When the business owner reconciles their financial statement lines and creates accounting transactions, the accountant can view the updates. Both the accountant and the business owner have real-time visibility into the health of the business.

For accounting software to provide up-to-the-minute financial reporting, up-to-the-minute financial data may be required. The present application describes example systems and methods by which a financial institution that holds a business's financial data can share this financial data with an accounting software system (e.g., a hosted online accounting software solution) for the benefit of their customers, via automated provisioning. Financial institutions that want to more closely integrate transactional financial services with a business platform provided by the accounting software system may benefit from the described systems. Example embodiments may seek to bring accounting software and the services of financial institutions closer together, as financial services and accounting services are complementary activities.

Figure 1:
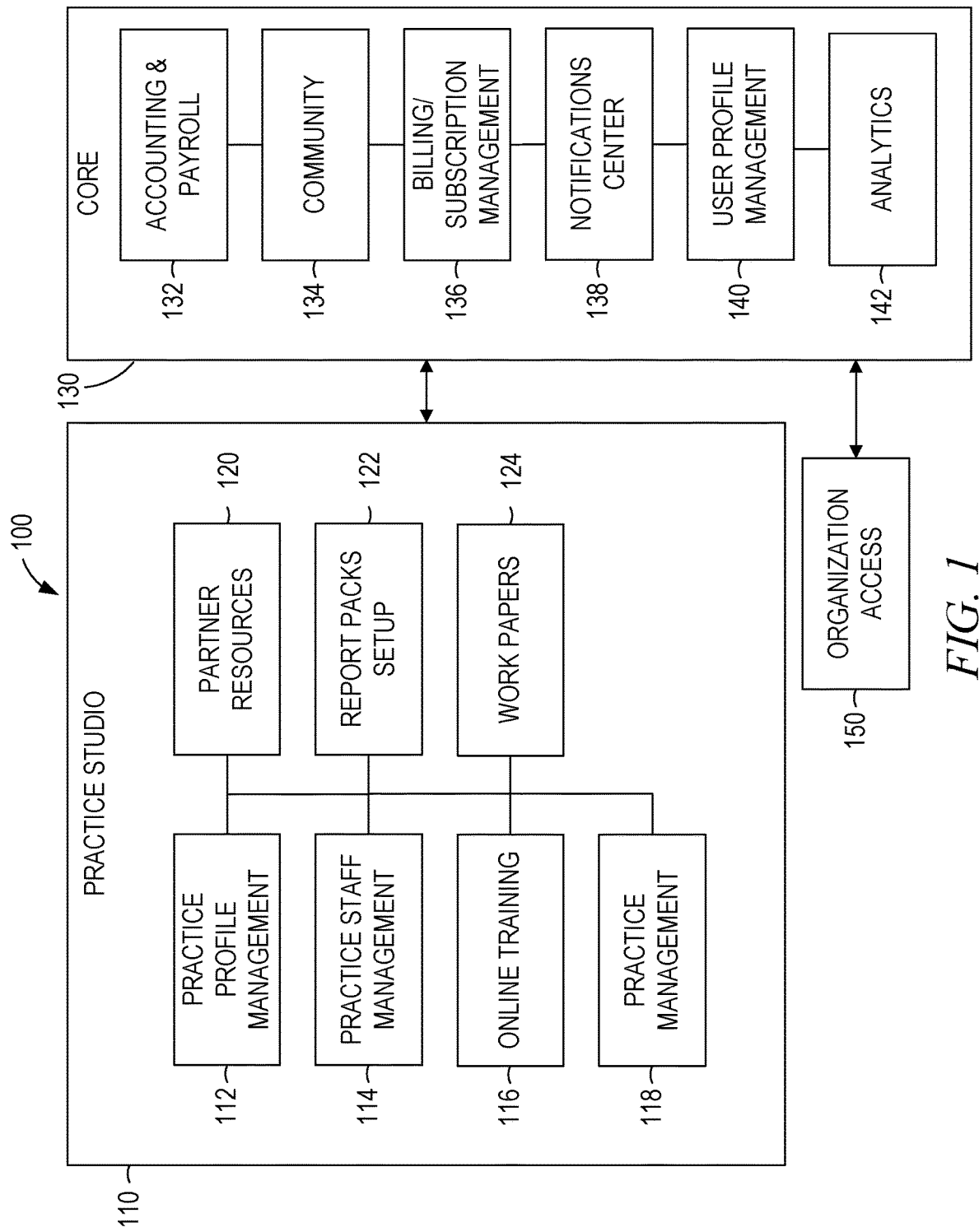
FIG. 1 is a block diagram depicting an example single ledger accounting platform, according to some embodiments.

FIG. 1 is a block diagram depicting an example single ledger accounting system 100. A single ledger accounting system 100 may provide accounting tools to a particular entity managing accounting for one or more businesses. The example single ledger accounting system 100 may include a practice studio 110 that allows an entity to manage one or more businesses and an organization access module 150 that provides a business with tools for managing accounting data for that particular business. The practice studio 110 may include a practice profile management module 112, a practice staff management module 114, an online training module 116, a practice management module 118, a partner resources module 120, a report packs setup module 122, and a work papers module 124. The practice studio 110, core features 130, and organization access module 150 are in communication (e.g., via function calls, APIs, or direct integration). The core features 130 may include an accounting and payroll module 132, a community module 134, a billing/subscription management module 136, a notifications center module 138, a user profile management module 140, and an analytics module 142. The practice studio 110 and core features 130 may be accessed by an entity using a login module (not shown).

As shown in FIG. 1, in some embodiments, the features of the system 100 are divided into three areas based on the target user. The features of the practice studio 110 provide a suite of tools for accountants to interact with their clients and manage their practices. The core features 130 provide the core functionality and user tools common to both accountants and businesses. The organization access module 150 provides a user interface for individual businesses to access their data.

In some embodiments, the Practice studio 110 is the central login for accountants. For example, an accountant with multiple clients, each of which is a small business, can log in using practice studio 110 and gain access to the accounting data for the clients, messages from the clients, and so on.

In some embodiments, the practice profile management module 112 allows an accounting practice to manage and view its profile settings. For example, an accounting practice may have a partner level, representing the strength of its relationship with the provider for the accounting platform. The partner level may be based on the number of clients associated with the accounting practice in the accounting platform. For example, a bronze partner level may be assigned to accounting practices with at least 5 clients, a silver partner level assigned to accounting practices with at least 20 clients, and a gold partner level assigned to accounting practices with at least 100 clients. Alternatively or additionally, the accounting practice may have one or more certifications provided by the accounting platform. The certifications may be provided automatically based on the completion of an online test and may expire after a predetermined period (e.g., one year) has elapsed. Other profile settings may include the name, address, telephone number, email address, and so forth of the accounting practice.

In some embodiments, the practice staff management module 114 provides the manager of an accounting practice the capability to control settings for the staff of the practice. For example, some staff members may have read-only access to data for certain clients, some staff members may have read-write access for certain clients, some staff members may be able to modify the access permissions for other staff members, and so on.

In some embodiments, the online training module 116 provides training for accountants and their staff. In some cases, the provided training includes one or more video presentations and one or more online tests. Notification of passing a test at completion of a training may be provided. For example, a staff member may take a training course and, upon successful completion, the accountant supervising the staff member may receive a notification of the successful completion.

In some embodiments, the practice management module 118 provides services for accountants. Access to the features provided by the practice management module 118 may be limited to accountants having a predetermined partner level with the accounting platform provider. For example, access to the practice management module 118 may be limited to accountants at silver level or above. The services provided by the practice management module 118 may include workflow tools, customer relationship management (CRM) tools, lead generation tools, job management tools, invoice generation tools, and so forth.

In some embodiments, the partner resources module 120 provides information regarding third-party partners. For example, a third party may provide tools that interact with the system 100 to provide useful functionality beyond that of the system 100 alone. The user can access the partner resources module 120 to learn about available third-party tools. For example, links to third-party websites, documentation, videos, and search tools may all be provided.

In some embodiments, the report packs setup module 122 provides tools to allow accountants to create and generate standardized sets of reports. For example, a profit and loss statement and quarterly report could both be added to a pack. The accountant would then be able to easily generate both reports for any selected client or generate the reports for every client.

In some embodiments, the work papers module 124 provides tools for accountants to interactively create financial reports. For example, an accountant can enter known data for a client into the work paper and then send the work paper to the client with an indication of data needed from the client. After the client enters the missing data into the work paper, the accountant can complete the report.

In some embodiments, the core features 130 include modules that are used both by accountants and organizations. The accounting and payroll module 132 provides the general ledger for organizations. The general ledger may be integrated with the organization's payroll, bypassing the separate step of entering payroll data into the general ledger each pay period. The accounting and payroll module 132 accesses banking data for each client business. The banking data may be imported either through a bank feed or a user- or accountant-created document. The accounting and payroll module 132 may also communicate with third-party tools via an application programming interface (API).

In some embodiments, the community module 134 provides a forum through which users can communicate. For example, a user with a question may post a topic in the forum and later receive a helpful response from another user. Information taken from the user profile (e.g., the user profile managed via the user profile management module 140) may appear along with forum posts by the user. For example, a user name, an image of the user, and the user's status as an accountant or member of an organization may each be shown.

In some embodiments, the billing/subscription management module 136 allows a user to configure one or more billing accounts for each organization using the system 100. The system 100 may periodically charge a subscription fee for access (e.g., a monthly or annual subscription fee). The subscription fee may be automatically deducted from the one or more billing accounts.

In some embodiments, the notifications center module 138 provides notifications to users. For example, users may send messages to each other, which appear as notifications. Notifications may also be created by the system 100 (e.g., by accounting and payroll module 132) based on events. For example, a minimum account balance for a particular bank account may be set by a user via the accounting and payroll module 132. When the balance for that bank account drops below the minimum account balance, a notification can be generated by the system 100 to inform the user.

In some embodiments, the user profile management module 140 allows a user to manage the profile of the user's organization and the profiles of others based on permission settings. For example, an accountant may have permission to manage the profiles of the accountant's clients. The profile may include public-facing information such as a business name and address.

In some embodiments, the login module verifies the identity of a user logging into the system 100 (e.g., via user name and password). Based on the user's identity, a user interface is presented that includes a list of organizations that a user has access to. For most small business clients, the list will consist of a single organization.

In some embodiments, the analytics module 142 analyzes and correlates data from different organizations. For example, a benchmark for a particular key performance indicator can be generated from a set of organizations and compared to the key performance indicator for another organization. Results from the comparison can be presented to a representative of the organization, an accountant for the organization, an auditor of the organization, or other interested parties.

In some embodiments, the organization access module 150 accesses the core features 130 for a single organization. The organization access module 150 presents, after user verification by the login module, a user interface with options for a single organization without the additional features used only by the practice studio 110.

Figure 2:
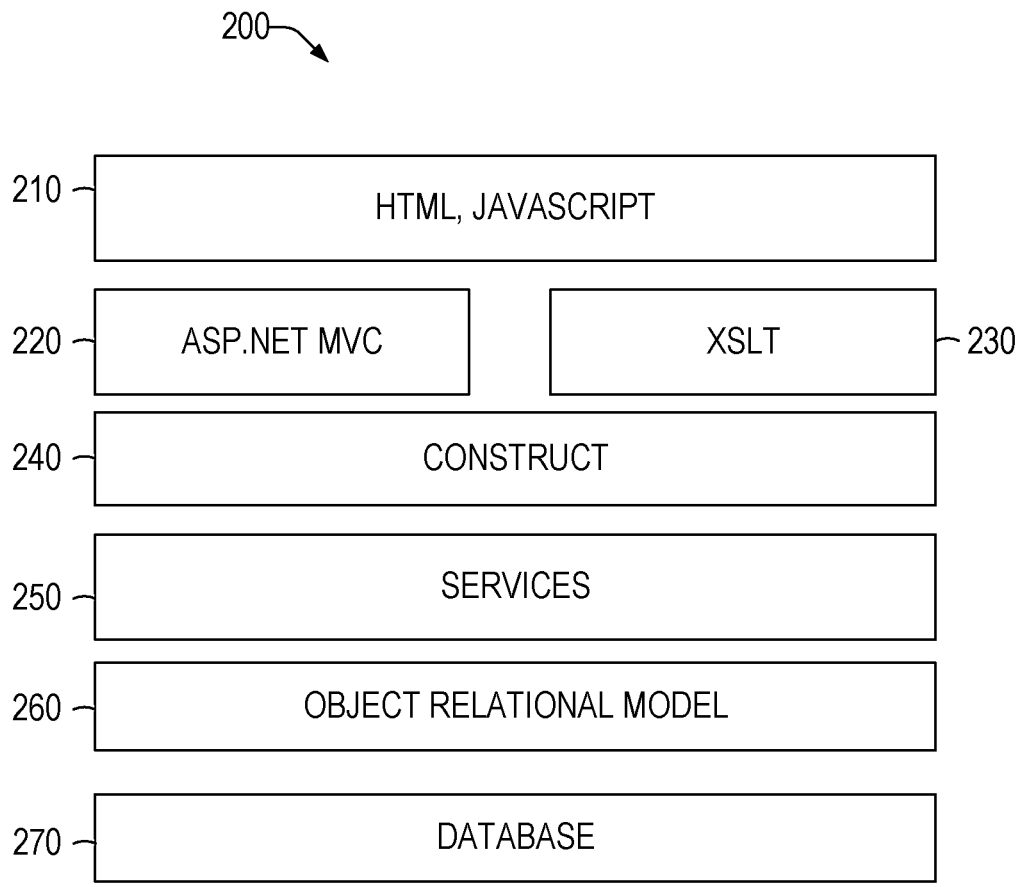
FIG. 2 is a block diagram depicting an example accounting application framework for the accounting platform, according to some embodiments.

FIG. 2 is a block diagram depicting an example accounting application framework 200 for the accounting platform. The accounting application framework 200 may be an end-to-end web development framework enabling a "software as a service" (SaaS) product. The accounting application framework 200 may include a hypertext markup language (HTML) and/or JavaScript layer 210, ASP.Net model-view-controller (MVC) 220, extensible stylesheet language transformations (XSLT) 230, construct 240, services 250, object relational model 260, and database 270.

In some embodiments, the HTML and/or JavaScript layer 210 provides client-side functionality, such as UI generation, receipt of user input, and communication with a server. The client-side code may be created dynamically by the ASP-.NET MVC 220 or the XSLT 230. Alternatively, the client-side code may be statically created or dynamically created using another server-side tool.

In some embodiments, the ASP.Net MVC 220 and XSLT 230 provide server-side functionality, such as data processing, web page generation, and communication with a client. Other server-side technologies may also be used to interact with the database 270 and create an experience for the user.

In some embodiments, the construct 240 provides a conduit through which data is processed and presented to a user. For example, the ASP.Net MVC 220 and XSLT 230 can access the construct 240 to determine the desired format of the data. Based on the construct 240, client-side code for presentation of the data is generated. The generated client-side code and data for presentation is sent to the client, which then presents the data.

In some embodiments, the services 250 provide reusable tools that can be used by the ASP.Net MVC 220, the XSLT 230, and the construct 240 to access data stored in the database 270. For example, aggregate data generated by calculations operating on raw data stored in the database 270 may be made accessible by the services 250.

In some embodiments, the object relational model 260 provides data structures usable by software to manipulate data stored in the database 270. For example, the database 270 may represent a many-to-one relationship by storing multiple rows in a table, with each row having a value in common. By contrast, the software may prefer to access that data as an array, where the array is a member of an object corresponding to the common value. Accordingly, the object relational model 260 may convert the multiple rows to an array when the software accesses them and perform the reverse conversion when the data is stored.

Figure 3:
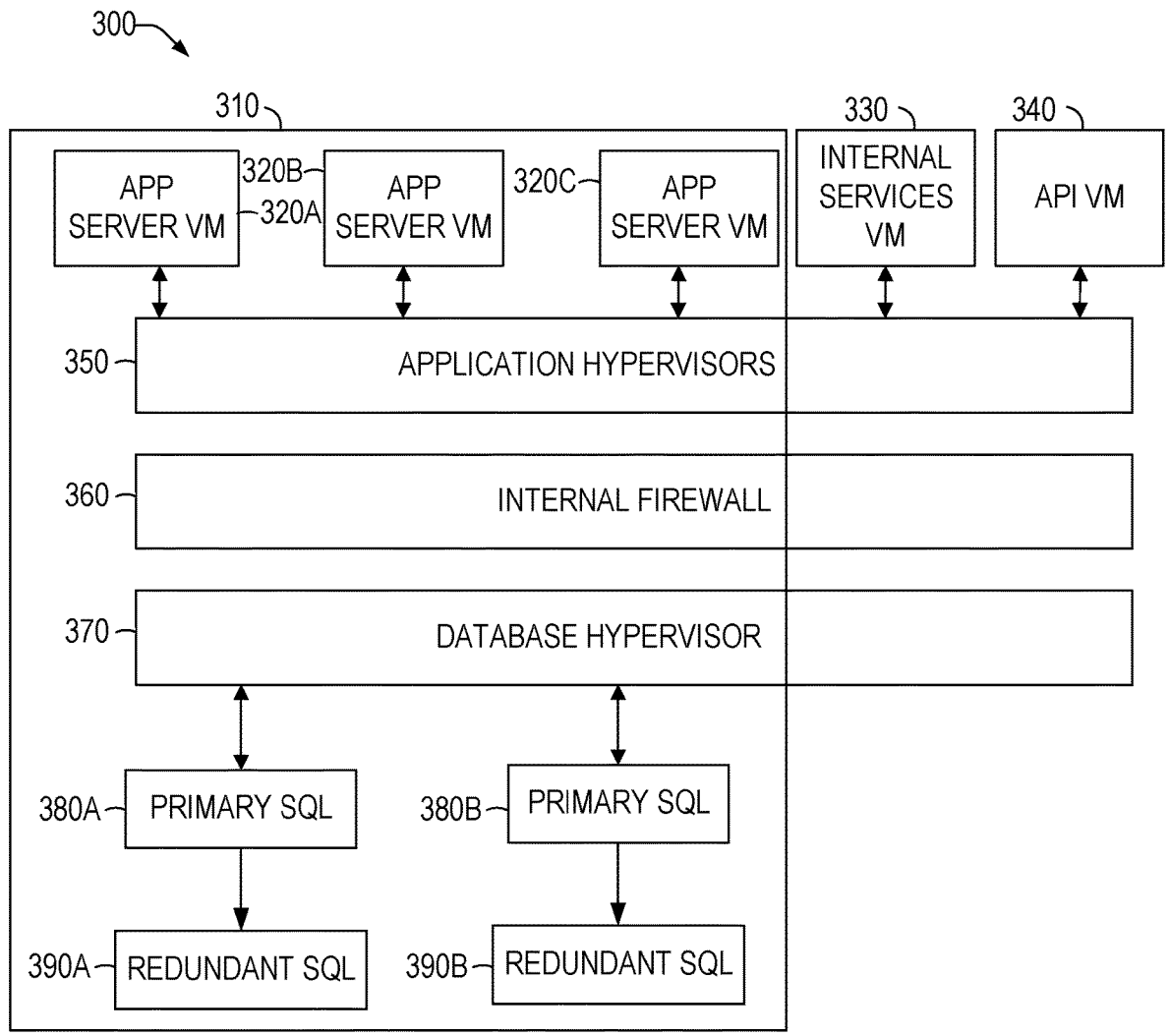
FIG. 3 is a block diagram depicting an example hosting infrastructure for the accounting platform, according to some embodiments.

FIG. 3 is a block diagram depicting an example hosting infrastructure 300 for the accounting platform. The platform may be implemented using one or more pods 310. Each pod 310 includes application server virtual machines (VMs) 320 (shown as application server virtual machines 320A-320C in FIG. 3) that are specific to the pod 310 as well as application server virtual machines 320 that are shared between pods 310 (e.g., the internal services VM 330 and the application programming interface VM 340). The application server virtual machines 320A-320C communicate with clients and third-party applications via a web interface or an API. The application server virtual machines 320A-320C are monitored by application hypervisors 350. In some example embodiments, the application server virtual machines 320A-320C and the API VM 340 are publicly-accessible while the internal services VM 330 is not accessible by machines outside of the hosting infrastructure 300. The application server VMs 320A-320C may provide end-user services via an application or web interface. The internal services VM 330 may provide back-end tools to the application server VMs 320A-320C, monitoring tools to the application hypervisors 350, or other internal services. The API VM 340 may provide a programmatic interface to third parties. Using the programmatic interface, the third parties can build additional tools that rely on the features provided by the pod 310.

In some embodiments, the internal firewall 360 ensures that only approved communications are allowed between the database hypervisor 370 and the publicly accessible virtual machines 320-340. The database hypervisor 370 monitors the primary structured query language (SQL) servers 380A and 380B. The primary SQL servers 380A and 380B access the shared storage layer 450A or 450B (shown in FIG. 4) to read and write data generated by or used by the application server virtual machines 320-340. The redundant SQL servers 390A and 390B provide backup functionality for the primary SQL servers 380A and 380B, respectively.

In some embodiments, the virtual machines 320-340 can be implemented using Windows 2008 R2, Windows 2012, or another operating system. The application and support servers supporting the virtual machines 320-340 can be built using spares for redundancy. The support servers can be shared across multiple pods 310. The application hypervisors 350, internal firewall 360, and database hypervisor 370 may span multiple pods 310 within a data center. In some example embodiments, each primary SQL server 380 and redundant SQL server 390 is configured to support 30,000-45,000 organizations. Accordingly, in embodiments using two such server pairs per pod 310, the pod capacity is 60,000-90,000 organizations. The redundant SQL servers 390 may take advantage of the "always on" resilience feature of SQL 2012.

Figure 4:
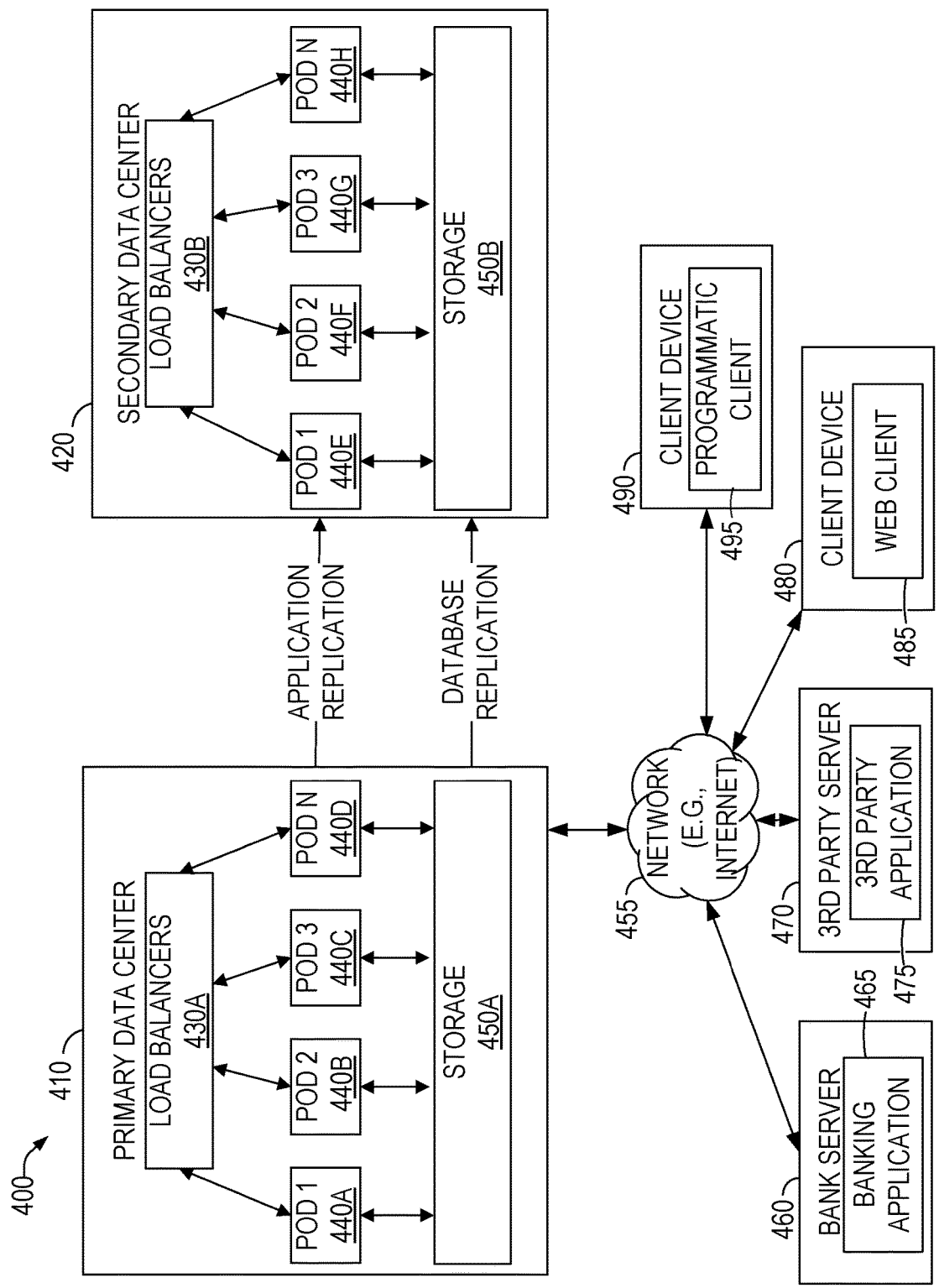
FIG. 4 is a block diagram depicting an example data center system of the accounting platform, according to some embodiments.

FIG. 4 is a block diagram depicting an example data center system 400 of the accounting platform interacting with other systems over a network. The primary data center 410 services customer requests and is replicated to the secondary data center 420. The secondary data center 420 may be brought online to serve customer requests in case of a fault in the primary data center 410. The primary data center 410 communicates over a network 455 with bank server 460, third party server 470, client device 480, and client device 490. The bank server 460 provides banking data (e.g., via the banking application 465). The third party server 470 is running third party application 475. Client devices 480 and 490 interact with the primary data center 410 using web client 485 and programmatic client 495, respectively.

Within each data center 410 and 420, a plurality of pods, such as the pod 310 of FIG. 3, are shown. The primary data center 410 is shown containing pods 440A-440D. The secondary data center 420 is shown containing pods 440E-440H. The applications running on the pods of the primary data center 410 are replicated to the pods of the secondary data center 420. For example, EMC replication (provided by EMC Corporation) in combination with VMWare site recovery manager (SRM) may be used for the application layer replication. The database layer handles replication between the storage 450A of the primary data center 410 and the storage 450B of the secondary data center 420. Database replication provides database consistency and the ability to ensure that all databases 270 are at the same point in time.

In certain embodiments, the data centers 410 and 420 use load balancers 430A and 430B, respectively, to balance the load on the pods within each data center. The data centers 410 and 420 can be created using identical hardware to ensure that the performance of the secondary data center 420 is the same as the performance of the primary data center 410. The storage 450 may be implemented using one or more EMC VNX storage area networks.

In certain embodiments, the bank server 460 interacts with the primary data center 410 to provide bank records for bank accounts of the client. For example, the client may provide account credentials to the primary data center 410, which the primary data center 410 uses to gain access to the account information of the client. The bank server 460 can provide the banking records to the primary data center 410 for later reconciliation by the client using the client device 480 or 490.

The third party server 470 may interact with the primary data center 410 and the client device 480 or 490 to provide additional features to a user of the client device 480 or 490. For example, a user may authorize the third party server 470 to access the user's data stored in the primary data center 410. The third party application 475 of the third party server 470 may use the user's data to generate reports, provide macros, or otherwise improve the user's ability to access or manipulate the user's data. The third party application 475 may communicate with the primary data center 410 via the network 455 using an API. The third party application 475 may communicate with the client device 480 or 490 using a web or programmatic interface.

Figure 5:
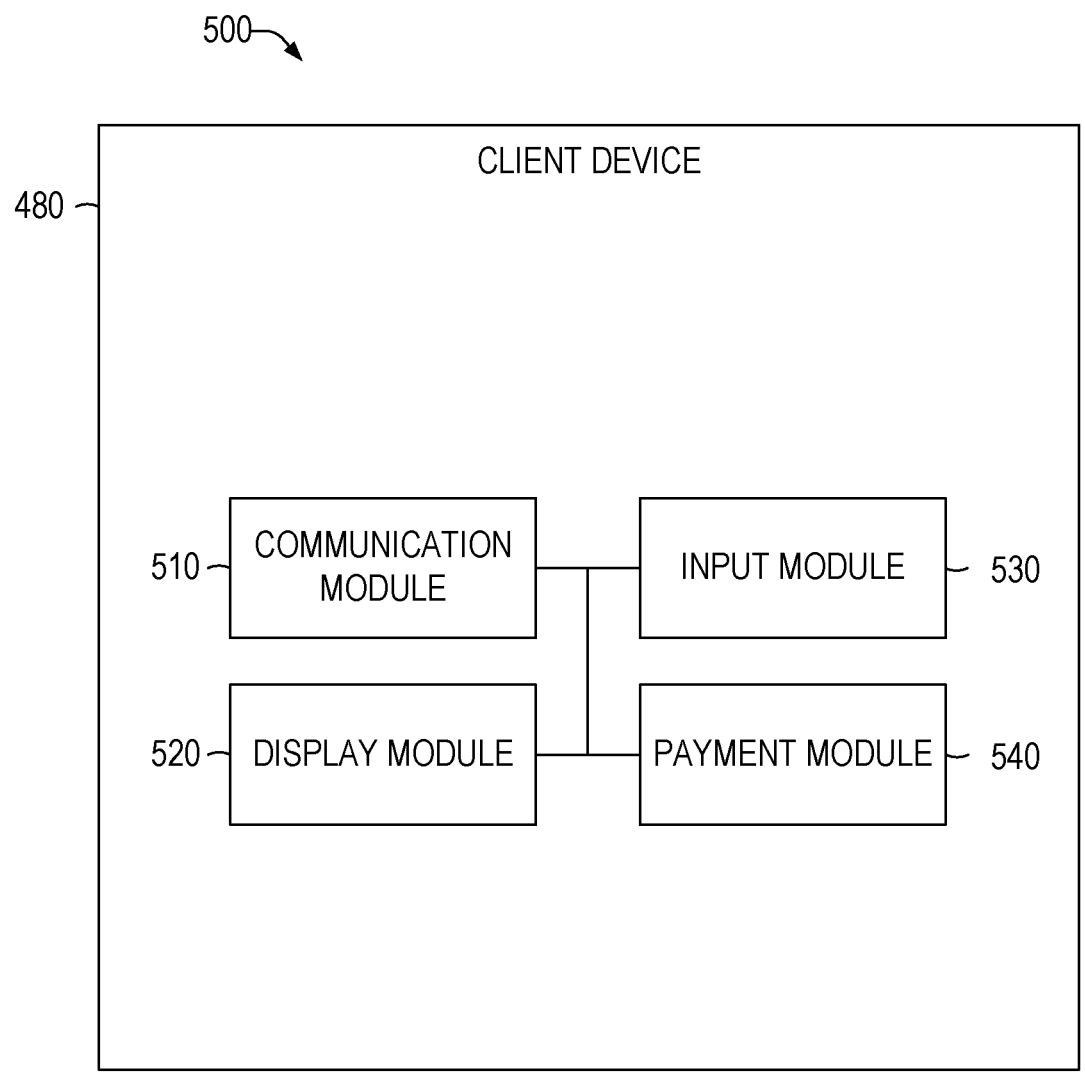
FIG. 5 is a block diagram depicting an example client device for accessing the accounting platform, according to some embodiments.

FIG. 5 is a block diagram 500 illustrating components of a client device 480 or 490 suitable for access control and system integration, according to some example embodiments. The client device 480 or 490 is shown as including a communication module 510, a display module 520, an input module 530, and a payment module 540, configured to communicate with each other (e.g., via a bus, shared memory, or a switch).

The communication module 510 may communicate with the primary data center 410, the bank server 460, the third party server 470, the network 455, or any suitable combination thereof. Information received via the communication module 510 may be presented (e.g., displayed on a display device) via the display module 520. Information may be selected or search queries may be entered by a user of the client device 480 or 490.

A user interface is presented by the display module 520. The input from the user is detected by the input module 530. Commands received from the user by the input module 530 may be communicated to the primary data center 410 or the bank server 460 by the communication module 510. The communication module 510 may receive a response from the primary data center 410 or the bank server 460 that includes a set of banking records, a set of business records, associations between individual banking records and individual business records that indicate reconciliation between those records, and other data, in any combination.

The payment module 540 can generate requests to the primary data center 410 to pay a bill or a batch of bills. The request can be communicated to the primary data center 410 via the communication module 510 over the network 455.

Figure 6:
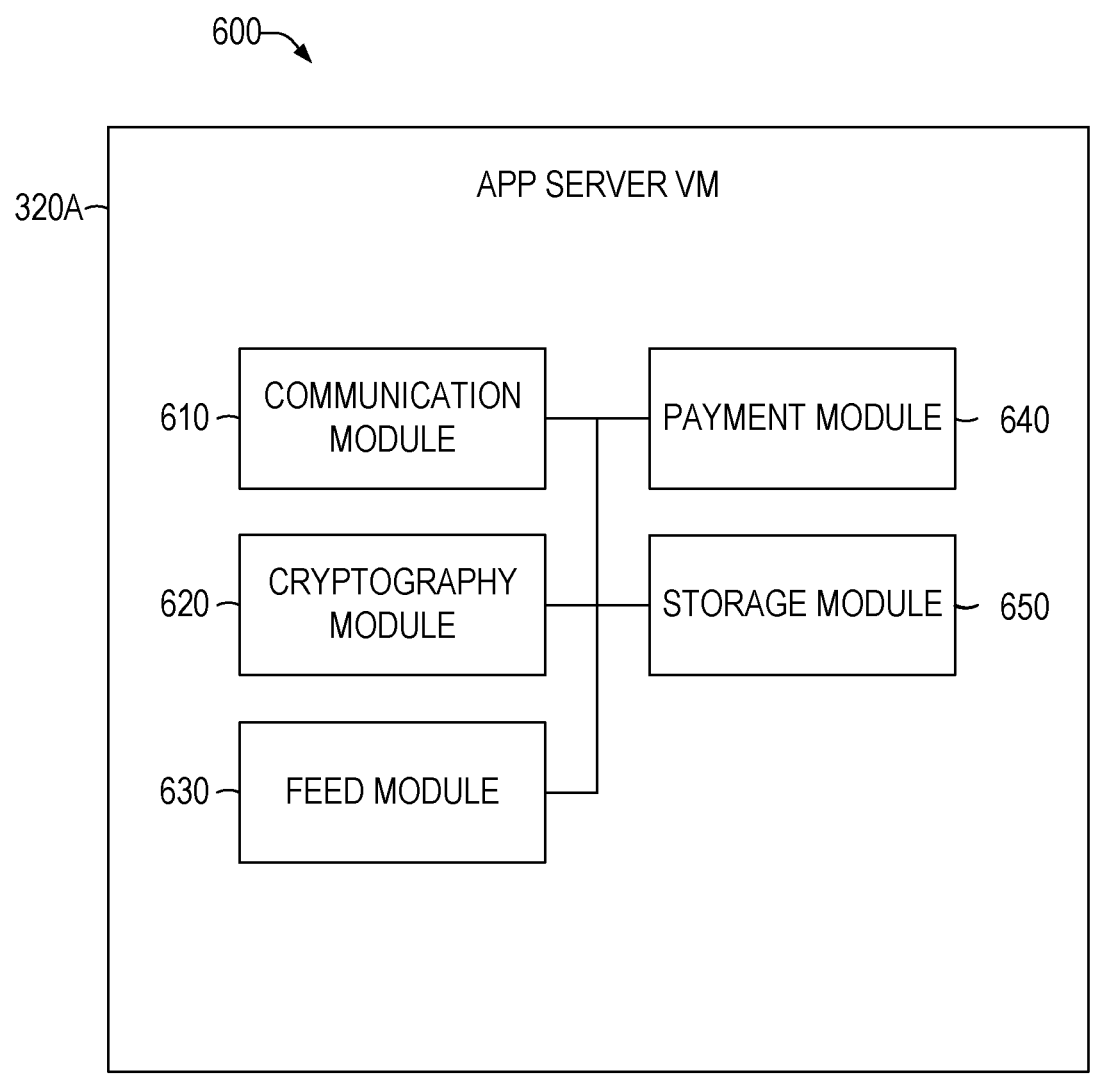
FIG. 6 is a block diagram depicting an example application server for the accounting platform, according to some embodiments.

FIG. 6 is a block diagram 600 illustrating components of an application server VM 320A suitable for access control and system integration, according to some example embodiments. The application server VM 320A is shown as including a communication module 610, a cryptography module 620, a feed module 630, a payment module 640, and a storage module 650, configured to communicate with each other (e.g., via a bus, shared memory, or a switch).

The communication module 610 may communicate with the client device 480 or 490, the bank server 460, the third party server 470, the network 455, or any suitable combination thereof. Information received via the communication module 610 may be stored via the storage module 650 or further processed by other modules 620-640.

The cryptography module 620 may encrypt communications prior to transmission by the communication module 610, decrypt communications after receipt by the communication module 610, encrypt or decrypt data stored by the storage module 650, or otherwise perform cryptographic functions.

The feed module 630 can process bank feeds received from a bank server (e.g., the bank server 460). For example, feed data can include information regarding transactions on a particular account of the providing bank. Using a database, corresponding bookkeeping accounts of a user of the accounting application can be identified and updated to reflect the transactions included in the feed.

The payment module 640 can process payment requests received from a user via the communication module 610. For example, using a database, bank accounts corresponding to bookkeeping accounts on which the payment requests were made can be identified. A request can be sent to the bank server 460 to complete the requested transactions. The bookkeeping data can also be updated to reflect the transactions in the storage module 650, to be communicated to the user via the communication module 610.

In certain embodiments, the storage module 650 provides data storage access for the application server VM 320. For example, storage may be provided by flash memory, a hard drive, network storage, or another storage medium and interfaced via the storage module 650.

Figure 7:
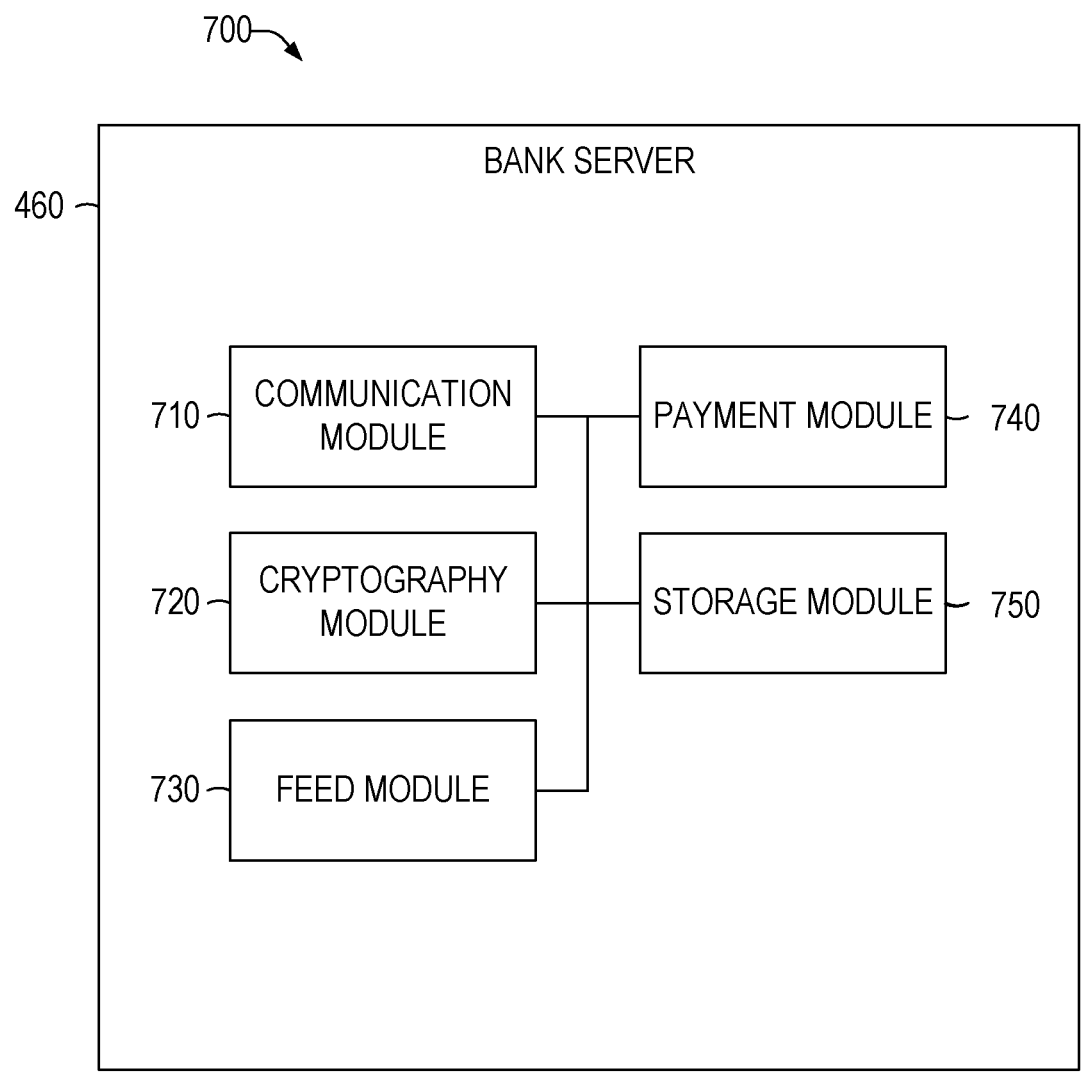
FIG. 7 is a block diagram depicting an example bank server for interacting with the accounting platform, according to some embodiments.

FIG. 7 is a block diagram 700 illustrating components of a bank server 460 suitable for access control and system integration, according to some example embodiments. The bank server 460 is shown as including a communication module 710, a cryptography module 720, a feed module 730, a payment module 740, and a storage module 750, configured to communicate with each other (e.g., via a bus, shared memory, or a switch).

The communication module 710 may communicate with the client device 480 or 490, the application server VM 320, the third party server 470, the network 455, or any suitable combination thereof. Information received via the communication module 710 may be stored via the storage module 750 or further processed by the cryptography module 720, the feed module 730, or the payment module 740.

The cryptography module 720 may encrypt communications prior to transmission by the communication module 710, decrypt communications after receipt by the communication module 710, encrypt or decrypt data stored by the storage module 750, or otherwise perform cryptographic functions.

The feed module 730 can generate bank feeds for an accounting server (e.g., the application server VM 320). For example, feed data can include information regarding transactions on a particular account authorized by the account holder and requested by the accounting application.

The payment module 740 can process payment requests received from the accounting application via the communication module 710. For example, a received communication can be decrypted by the cryptography module 720 and then verified and processed by the payment module 740, completing the requested transactions (e.g., by updating appropriate records using the storage module 750, communicating with other financial institutions using the communication module 710, or both).

The storage module 750 provides data storage access for the bank server 460. For example, storage may be provided by flash memory, a hard drive, network storage, or another storage medium and interfaced via the storage module 750.

Figure 8:
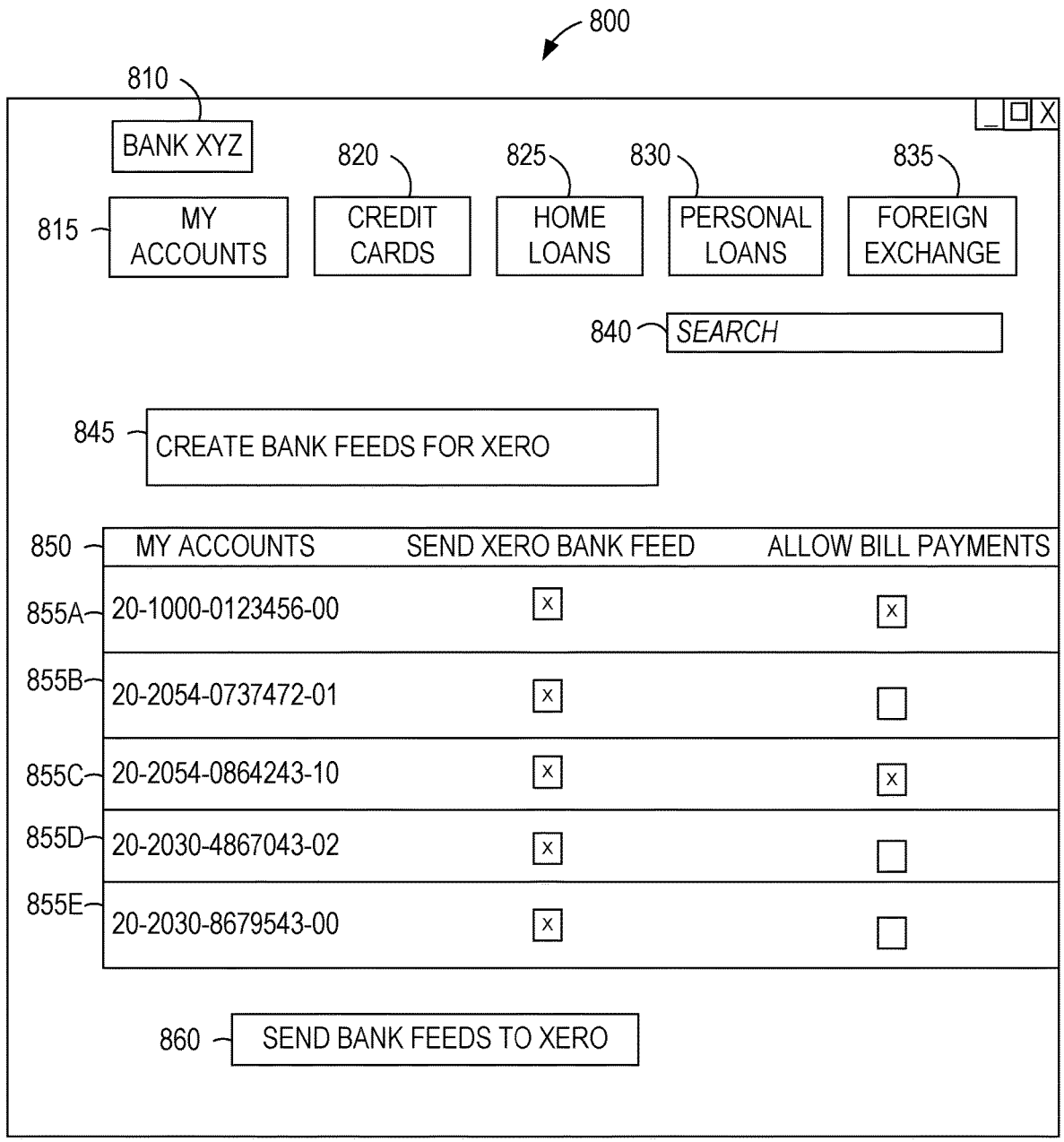
FIG. 8 is an interface diagram depicting an example user interface displaying accounts accessible by a user of a bank, according to some embodiments.

FIG. 8 is an interface diagram depicting an example user interface (UI) 800 displaying accounts accessible by a user of a bank, according to some embodiments. The UI 800 includes individual rows 855A-855E of data with information about different accounts and may be referred to collectively as rows 855. Similarly, an individual one of the rows 855 may be referred to as a row 855. The UI 800 may be displayed by the display module 520 of the client device 480 or 490 to a user accessing the bank server 460.

The element 810 shows the name of the bank providing the user interface. The elements 815-835 comprise a menu bar, operable to view the user's various accounts or features provided by the bank. For example, the element 835, labeled "foreign exchange," may be operable to show the user the various foreign exchange services offered by the bank.

The element 840 is a search tool. The element 840 may be operable to search the bank web site, search the accounts and transactions of the user, or both.

The element 845 is a text box that shows information regarding the current screen to the user. In this case, the element 845 indicates that the user can create bank feeds for Xero, an example accounting application.

The element 850 contains titles for the columns of data shown below it in the rows 855A-855E. Each row 855 in the table includes an account number and two check boxes. The check boxes are operable to select and deselect the options of sending a feed for the account to the accounting service (shown in the center column) and allowing bill payments by the accounting service to be drawn on the account (shown in the rightmost column). For example, the row 855C shows an account number of 20-2054-0864243-10 and has both check boxes checked, indicating that a feed should be provided to the accounting service and that bill payments will be allowed on the account. By contrast, the row 855E has only the first box checked, indicating that while a bank feed will be provided, bill payments will not be allowed.

In some embodiments, the element 860 is operable to accept the feed settings chosen using the checkboxes in the rows 855A-855E. As shown in FIG. 8, the element 860 is operable to cause feeds to be sent for all five displayed accounts, and to allow bill payments on two of the accounts.

Figure 9:
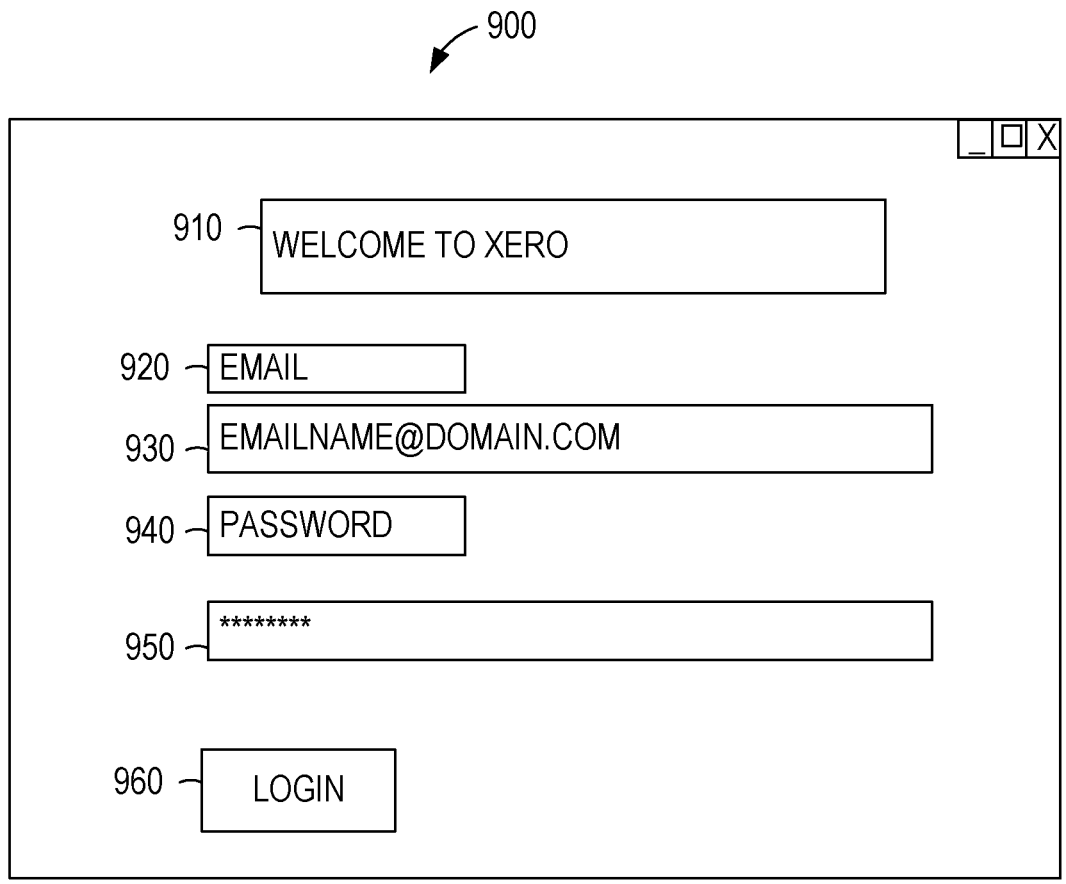
FIG. 9 is an interface diagram depicting an example user interface for logging into the accounting platform, according to some embodiments.

FIG. 9 is an interface diagram depicting an example user interface 900 for logging into the accounting platform, according to some embodiments. The UI 900 may be displayed by the display module 520 of the client device 480 or 490 to a user accessing the application server VM 320. The element 910 displays a prompt, title, or application identifier to the user. Similarly, the elements 920 and 940, reading "email" and "password," respectively, prompt the user to enter corresponding information in the text fields 930 and 950. The element 960, labeled "login," is operable to submit the email and password information entered into the text fields 930 and 950 to the accounting platform. If the entered information is correct, the accounting platform allows the user to access information for accounts associated with the user (e.g., for which the user has the appropriate security permissions to access the data).

Figure 10:
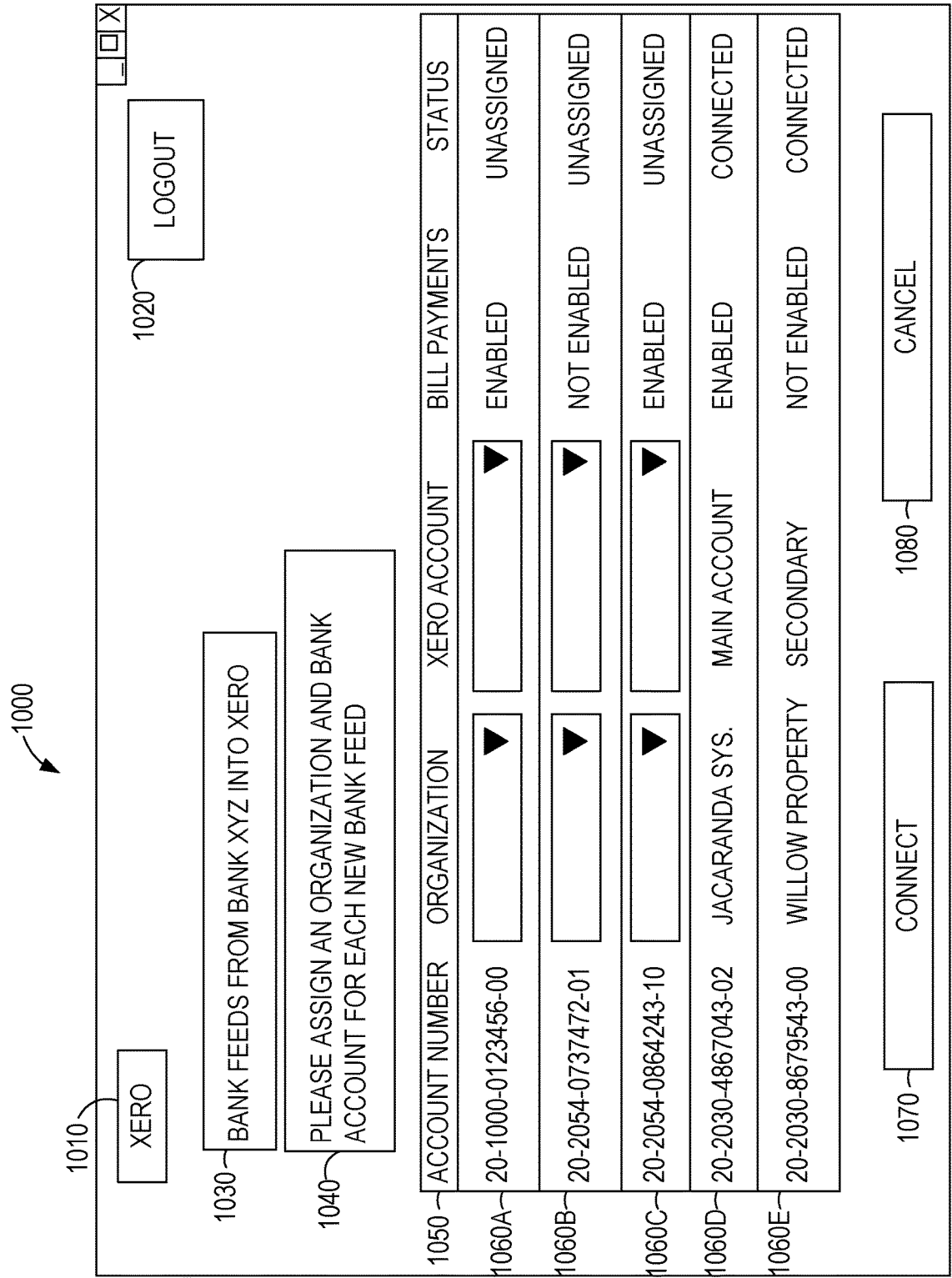
FIG. 10 is an interface diagram depicting an example user interface for enabling bank feeds into the accounting platform, according to some embodiments.

FIG. 10 is an interface diagram depicting an example user interface 1000 for enabling bank feeds into the accounting platform, according to some embodiments. The rows 1060A-1060E are individual rows of data with information about different accounts and may be referred to collectively as rows 1060. Similarly, an individual one of the rows 1060 may be referred to as a row 1060. The UI 1000 may be displayed by the display module 520 of the client device 480 or 490 to a user accessing the application server VM 320.

The element 1010 indicates the name of the accounting platform, and may be operable to return to a home page or main screen for the accounting application. The element 1020, labeled "logout," is operable to log the user out of the accounting platform. The elements 1030 and 1040 provide information to the user about the current screen.

The element 1050 indicates the types of data shown in each of the rows 1060 in the table. Accordingly, each of the rows 1060 shows an account number of an account at a financial institution, an organization holding the account, a bookkeeping account of the accounting application corresponding to the financial account, whether or not bill payments are enabled on the account, and the current status of the account. In FIG. 10, bill payments are either enabled or not enabled, and the status of each account is either connected or unassigned. Additional status options may be available in various embodiments. The rows 1060A-1060C show drop-down menus instead of a name for both the organization and the bookkeeping account of the row 1060. The drop-down menus are operable to select organizations and accounts, respectively, that are available to the user. For example, if the user is an accountant for several businesses, the organization drop-drown may be pre-populated with the businesses for which the user is an accountant.

The element 1070, labeled "connect," is operable to connect any accounts for which the user has selected the appropriate information. For example, if the user is selecting both an organization and a bookkeeping account for an unassigned account, then activating the element 1070 causes the unassigned account to be assigned and connected. The element 1080, labeled "cancel," is operable to cancel any changes made.

Figure 11:
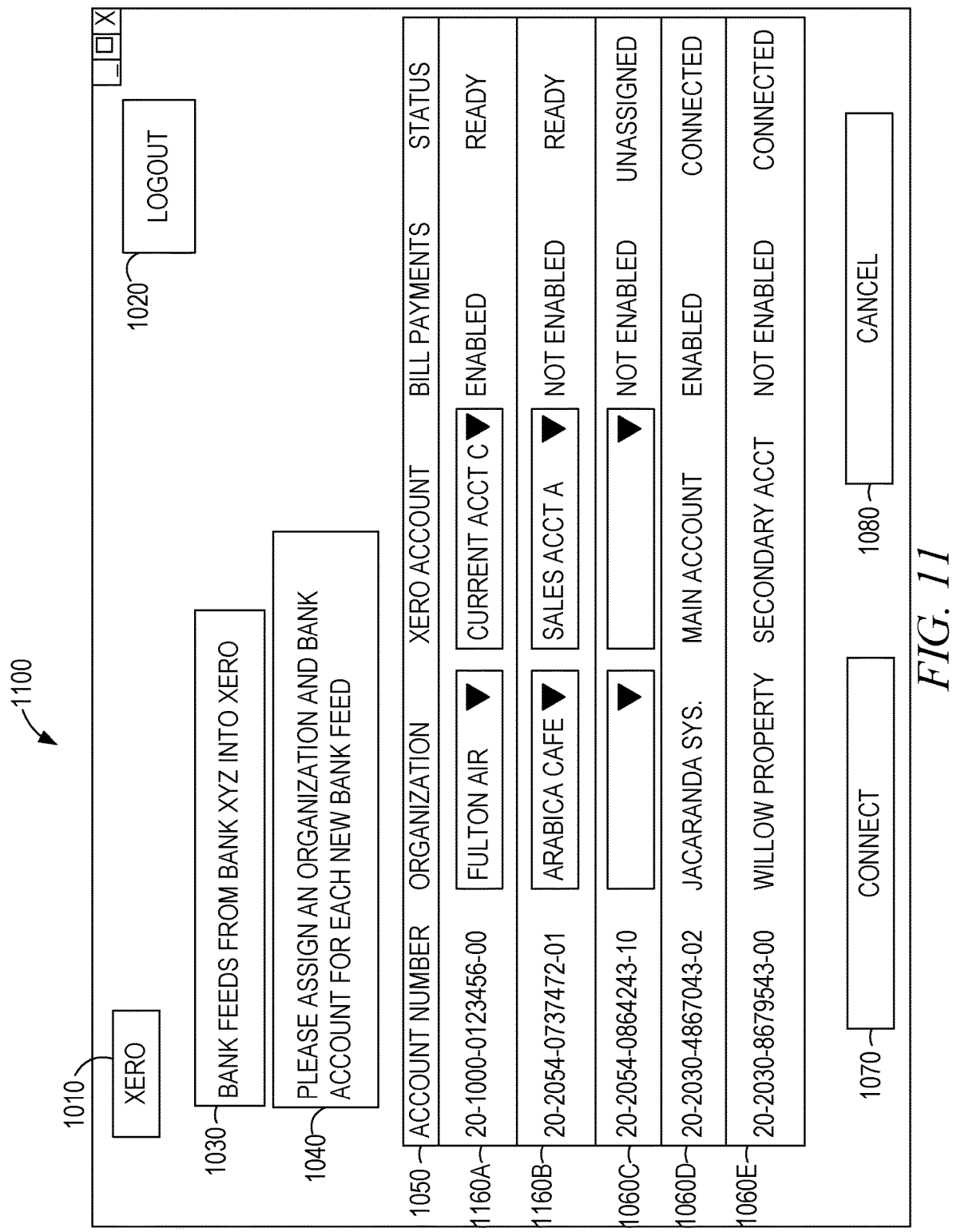
FIG. 11 is an interface diagram depicting an example user interface for enabling bank feeds into the accounting platform, according to some embodiments.

FIG. 11 is an interface diagram depicting an example user interface 1100 for enabling bank feeds into the accounting platform, according to some embodiments. The elements 1010-1050, rows 1060C-1060E, element 1070, and element 1080 are described above with respect to FIG. 10. The UI of FIG. 11 may be shown after a user has selected organizations and bookkeeping accounts for the rows 1060A and 1060B in the UI 1000.

The rows 1160A and 1160B show that organizations and bookkeeping accounts have been selected by populating the selection area of the corresponding drop-down menus. As a result, the status column of rows 1160A and 1160B now show "ready," indicating that operation of the element 1070 will cause an attempt to be made to connect the accounts.

Figure 12:
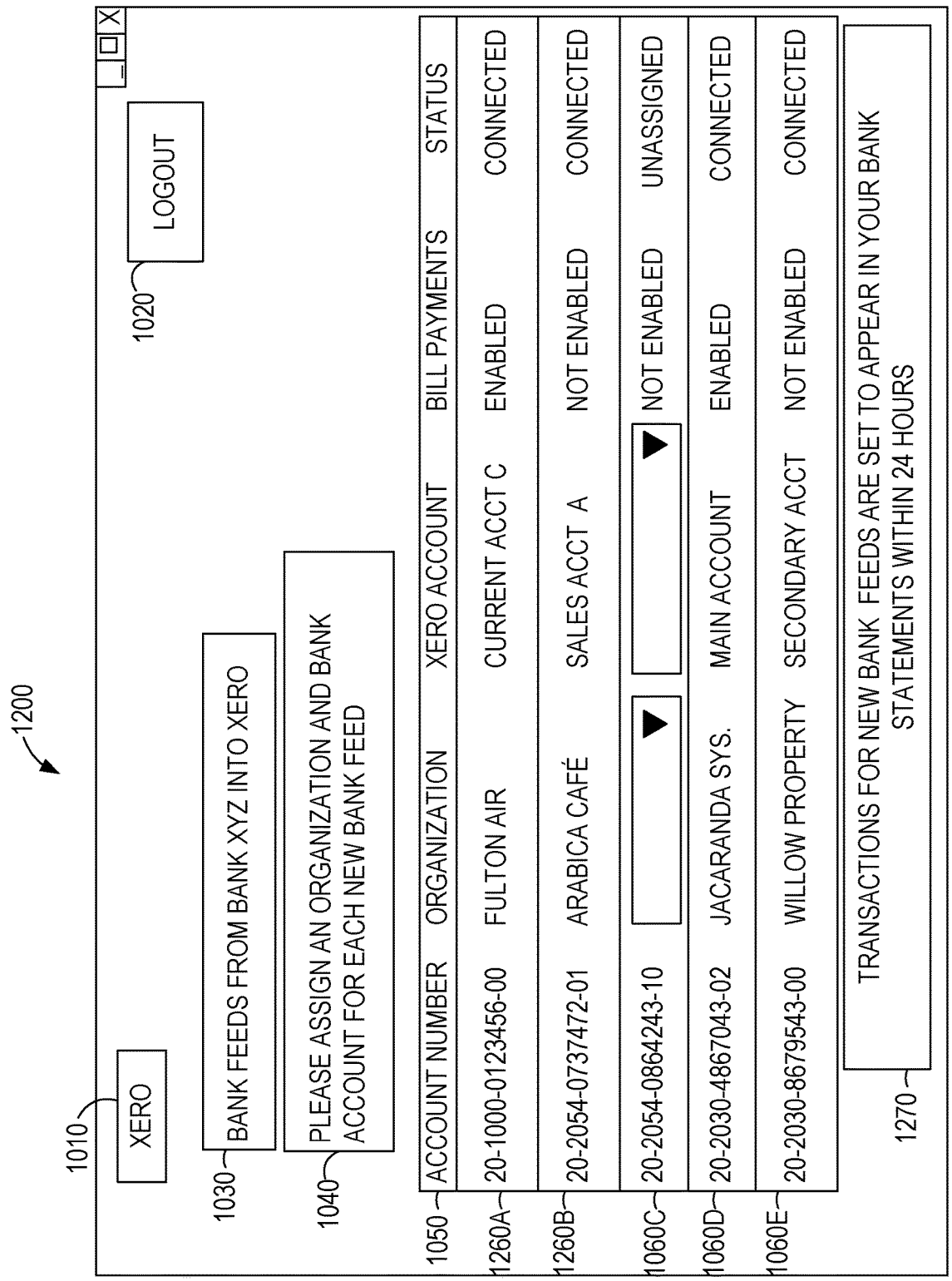
FIG. 12 is an interface diagram depicting an example user interface for enabling bank feeds into the accounting platform, according to some embodiments.

FIG. 12 is an interface diagram depicting an example user interface 1200 for enabling bank feeds into the accounting platform, according to some embodiments. The UI 1200 may be shown after a user activates the element 1070 in the UI 1100 to cause one or more banking accounts to be connected to the accounting platform. The elements 1010-1050, rows 1060C-1060E, and element 1070 are described above with respect to FIG. 10.

The rows 1260A and 1260B show that the attempt to connect the accounts shown in the rows 1160A and 1160B of FIG. 11 was successful by indicating the status of the two rows as connected. Additionally, the row 1260A shows that bill payments have been enabled.

The element 1270 informs the user that information from the newly-established feeds should appear within 24 hours. In some embodiments, an initial feed is immediately retrieved.

Figure 13:
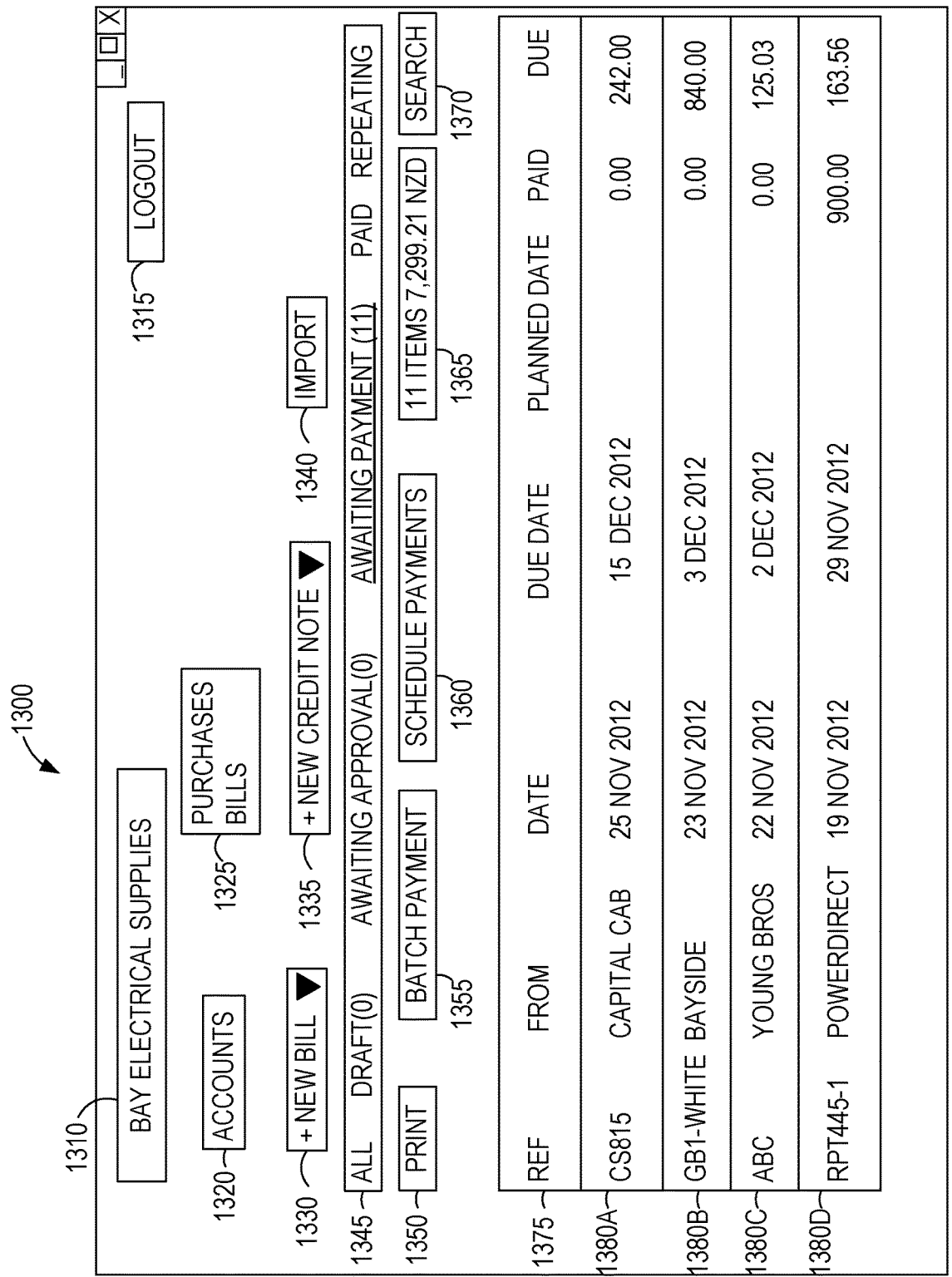
FIG. 13 is an interface diagram depicting an example user interface for submitting batch payments through the accounting platform, according to some embodiments.

FIG. 13 is an interface diagram depicting an example user interface 1300 for submitting batch payments through the accounting platform, according to some embodiments. The rows 1380A-1380D may be referred to collectively as rows 1380. Similarly, an individual one of the rows 1380 may be referred to as a row 1380. The UI 1300 may be displayed by the display module 520 of the client device 480 or 490 to a user accessing the application server VM 320.

The element 1310 identifies the organization for which the batch payment screen is shown. The element 1315 is operable to log out of the accounting platform. The elements 1320 and 1325 show information regarding the currently displayed screen. Specifically, they show that the user is interacting with accounts in the accounting platform, and paying bills with those accounts.

The element 1330 is operable to add a new bill into the accounting system. For example, clicking on, touching on a touch screen, or otherwise interacting with the element 1330 may cause a UI window to appear that prompts the user to enter data for a new bill.

The element 1335 is operable to add a new credit note into the accounting system. For example, clicking on, touching on a touch screen, or otherwise interacting with the element 1335 may cause a UI window to appear that prompts the user to enter data for a new credit note.

The element 1340 is operable to import one or more records into the accounting system. For example, clicking on, touching on a touch screen, or otherwise interacting with the element 1340 may cause a UI window to appear that prompts the user to enter a file name of a file containing records to import.

The element 1345 shows various predefined search options. Each search option may be operable (e.g., as a hyperlink) to cause the table below, containing the rows 1380, to update to show only the bills conforming to the selected search option. The search options shown are "all," corresponding to a search that shows all bills for the organization shown in the element 1310, "draft," corresponding to a search that shows incomplete bills, "awaiting approval," corresponding to a search that shows bills that have been completed but not approved by an appropriate member of the organization (e.g., a CFO), "awaiting payment," corresponding to a search that shows bills that are ready to be paid, "paid," corresponding to a search that shows bills that have already been paid, and "repeating," corresponding to a search that shows bills that recur on a periodic basis. Additionally, one or more of the search options shown in the element 1345 may indicate the number of results corresponding to the search option. For example, the search option labeled "awaiting payment" indicates that 11 search results are available.

The element 1350 is operable to print a report of the currently displayed bills. The element 1355 is operable to generate a batch payment of a set of bills. The element 1360 is operable to schedule payments for future execution. The element 1365 displays the total number of bills and their total amount, along with the denominating currency. The element 1370 is operable to search for bills by specified criteria. Each of elements 1350, 1355, 1360, and 1370 may cause a corresponding UI to be presented to gather the inputs from the user for use in executing the function of the element.

The element 1375 is a header row that shows the data contained in each of the rows 1380. Thus, each of the rows 1380 shows one or more of a reference identifier for the bill, a name of the entity that sent the bill, the date the bill was generated or received, the date the bill is due, the planned date on which the bill is scheduled to be paid, the amount of the bill already paid, and the amount of the bill still outstanding. In various embodiments, more, fewer, or different columns may be shown.

Figure 14:
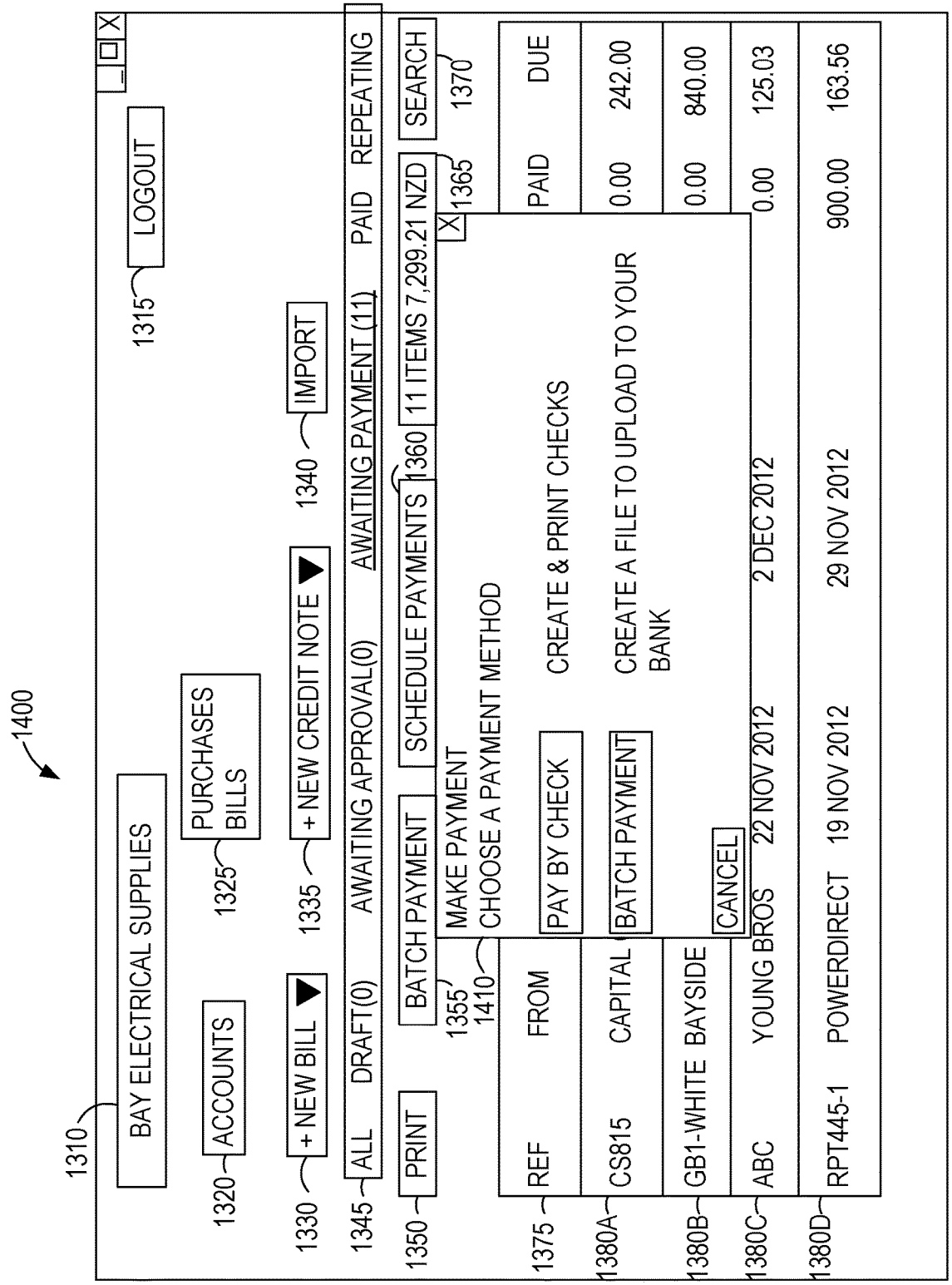
FIG. 14 is an interface diagram depicting an example user interface for submitting batch payments through the accounting platform, according to some embodiments.

FIG. 14 is an interface diagram depicting an example user interface 1400 for submitting batch payments through the accounting platform, according to some embodiments. The elements 1310-1375 and rows 1380A-1380D are described above with respect to FIG. 13. The UI 1400 may be shown after a user has interacted with the element 1355, labeled "batch payment," of the UI 1300.

The element 1410 is a pop-up window presented in response to operation of the element 1355. Three options in the pop-up window are presented. The pay by check option is operable to create and print checks, the batch payment option is operable to create a file with payment information that can be uploaded to the user's bank, and the cancel option is operable to close the pop-up window and cancel the batch payment.

Figure 15:
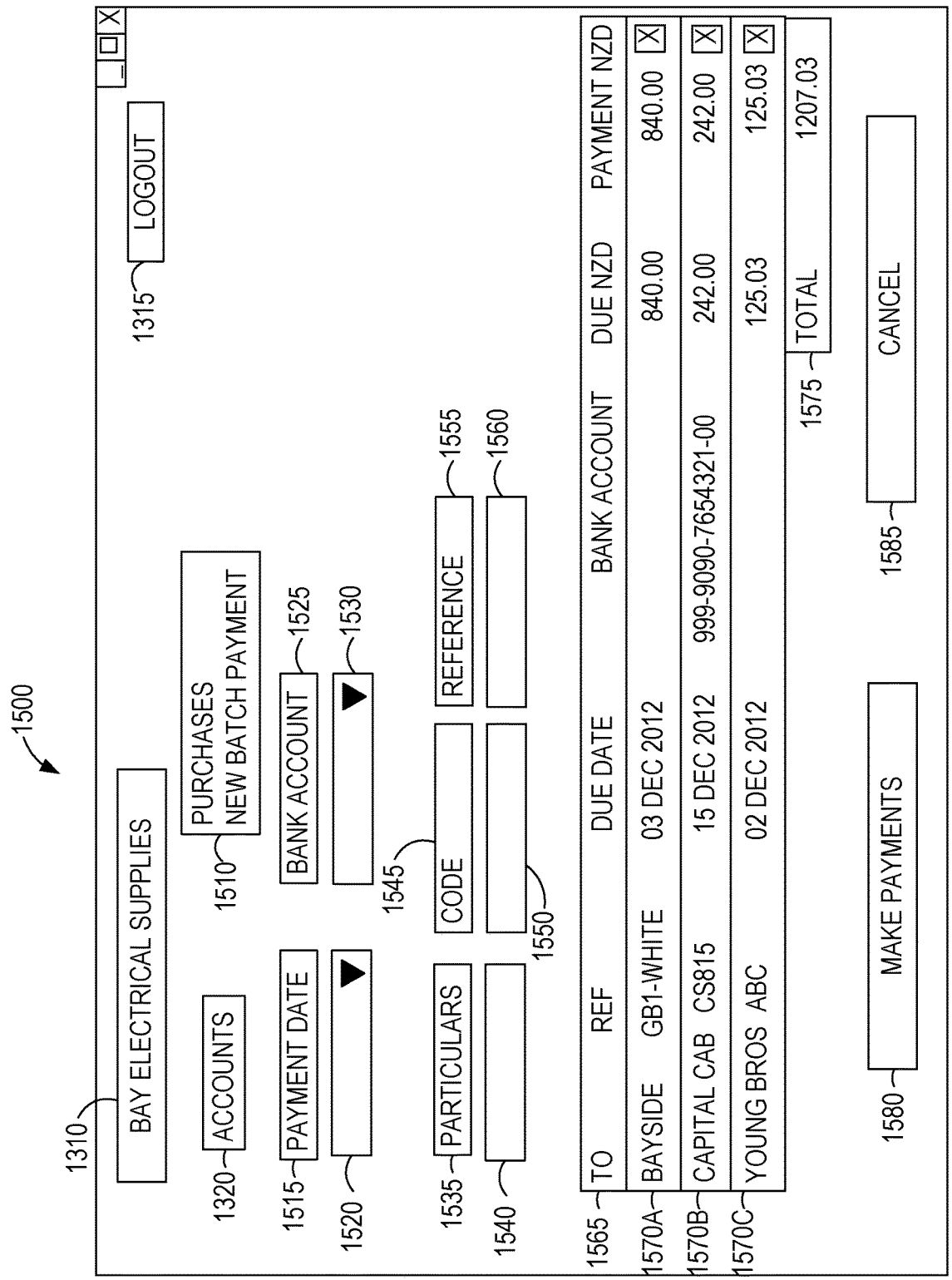
FIG. 15 is an interface diagram depicting an example user interface for submitting batch payments through the accounting platform, according to some embodiments.

FIG. 15 is an interface diagram depicting an example user interface 1500 for submitting batch payments through the accounting platform, according to some embodiments. The elements 1310-1320 are described above with respect to FIG. 13. The rows 1570A-1570C may be referred to collectively as rows 1570. Similarly, an individual one of the rows 1570A-1570C may be referred to as a row 1565. The UI 1500 of FIG. 15 may be shown after one of the options to generate checks or a payment file is selected from the element 1410 of FIG. 14.

The element 1510, in conjunction with the element 1320, informs the user of the current screen being viewed. In this case, the user is creating a new batch payment to pay for purchases with one or more of the user's accounts.

The elements 1515 and 1525 are headers corresponding to the selectors 1520 and 1530, respectively. The selector 1520 is operable to select a payment date on which the batch will be paid. For example, the selector 1520 may be implemented using a calendar picker, a text input field, or another method. The selector 1530 is operable to select a bank account from which the batch will be paid. For example, the selector 1530 may be implemented using a drop-down list that is pre-populated with bank accounts known to the accounting platform.

The elements 1535, 1545, and 1555 correspond to the text entry fields 1540, 1550, and 1560, respectively. The text entry fields 1540, 1550, 1560 are operable to enter particulars (field 1540), code values (field 1550), and reference values (field 1560) for each payment in the batch. In various embodiments, the particulars, code, and reference value may be pre-populated, selected from a drop-down list, or otherwise selected. The particulars, code, and reference values may have meaning to the organization, the financial institution, the payee, or another party.

The element 1565 contains headers for the table populated by the rows 1570. Each of the rows 1570 includes one or more of a name of payee, a reference for the bill, a due date of the bill, a bank account to which payment for the bill will be made, an amount due, and a payment amount. Each of the rows 1570 also includes an element operable to remove the row from the batch, shown as a box containing an "x" in the UI 1500. The element 1575 informs the user of the total amount being paid in the batch.

The element 1580 is operable to make the payments using the selected options. For example, a batch consisting of the three bills shown may be created. The element 1585 is operable to cancel the batch payment. For example, interacting with the element 1585 may cause the user to return to the UI 1300.

Figure 16:
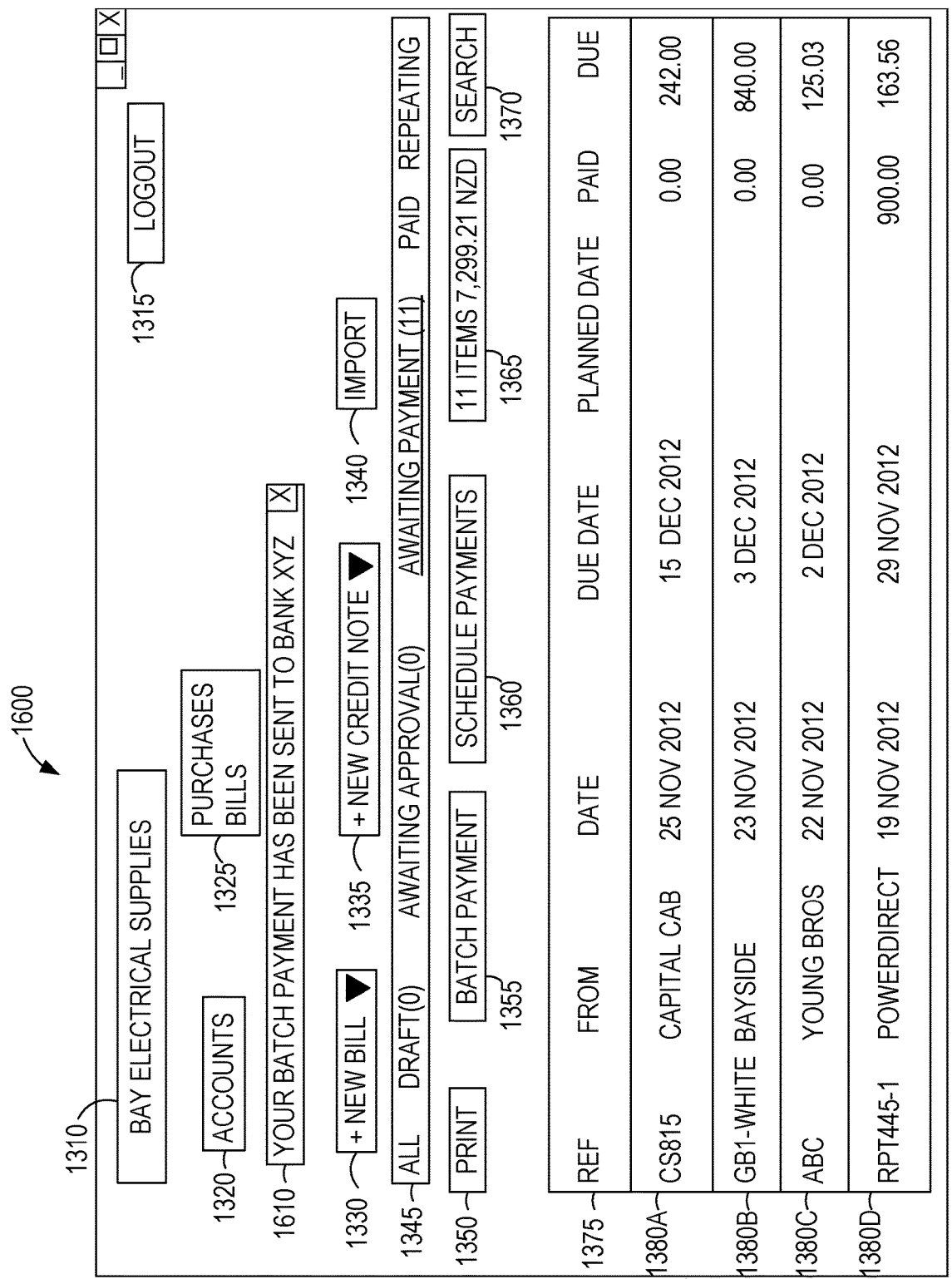
FIG. 16 is an interface diagram depicting an example user interface for submitting batch payments through the accounting platform, according to some embodiments.

FIG. 16 is an interface diagram depicting an example user interface 1600 for submitting batch payments through the accounting platform, according to some embodiments. The elements 1310-1375 and rows 1380A-1380D are described above with respect to FIG. 13. The UI 1600 of FIG. 16 may be shown after a batch is submitted using the UI 1500 of FIG. 15. The element 1610 shows a confirmation message, indicating that the batch payment has been submitted.

Figure 17:
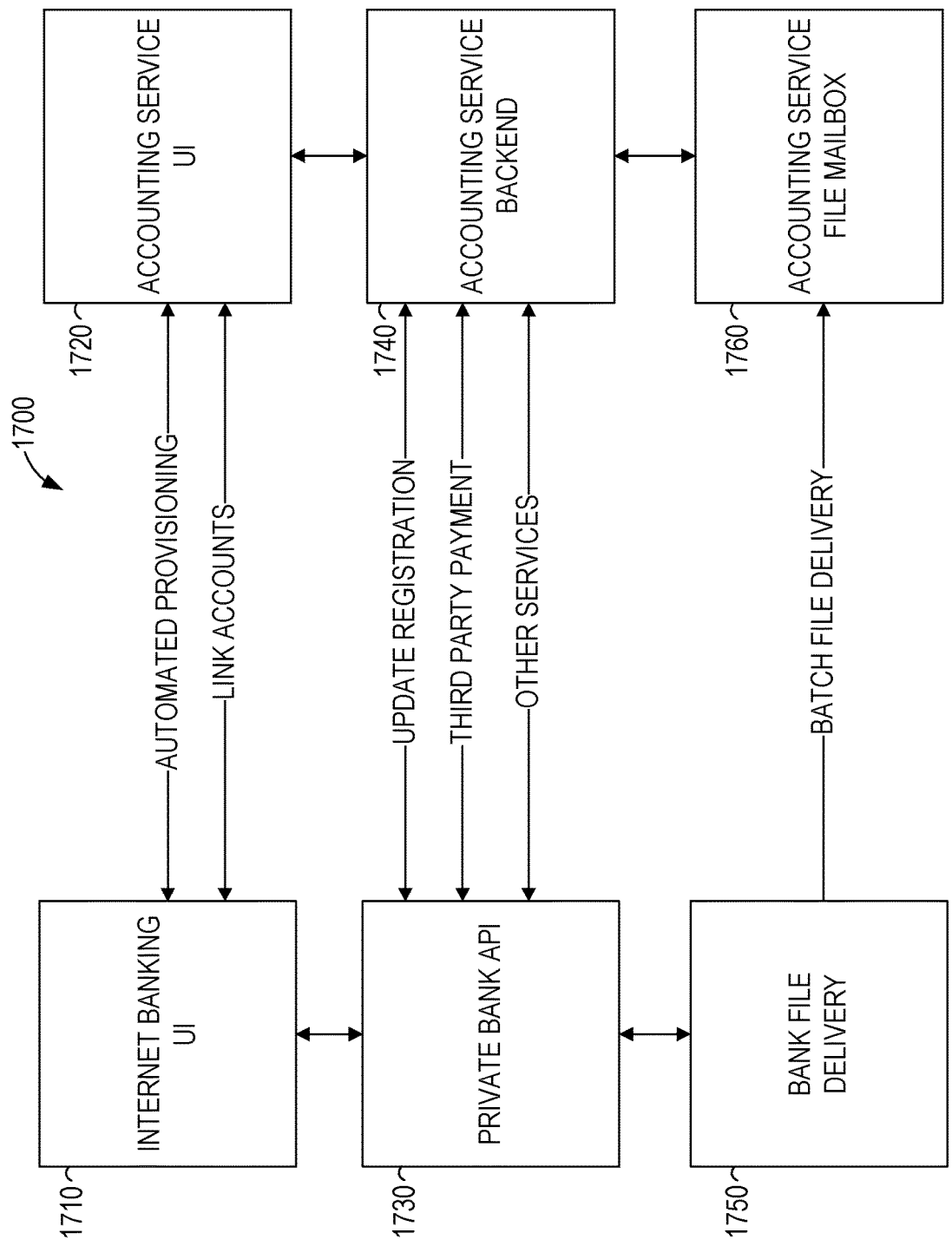
FIG. 17 is a block diagram depicting an example data flow for interactions between the banking platform and the accounting platform, according to some embodiments.

FIG. 17 is a block diagram 1700 depicting an example data flow for interactions between the banking platform and the accounting platform, according to some embodiments.

A user (not shown) interacts with the internet banking UI 1710 to select one or more accounts to share with an accounting service provider. The internet banking UI 1710 redirects the user to the accounting service UI 1720. The accounting service UI 1720 authenticates the user and links the bookkeeping accounts of the user with the bank accounts at the internet banking service. The accounting service UI 1720 further communicates with the accounting service backend 1740 to store the account linkage data. The accounting service backend 1740 communicates with the bank using the private bank API 1730. Features provided by the private bank API 1730 include updating registration for a bank account, making a third party payment drawn from a registered bank account, and other services. The bank file delivery 1750 provides a bank record feed for registered account via a batch file delivery to the accounting service file mailbox 1760, based on registration of the account via the private bank API 1730. The accounting service file mailbox 1760 provides the received batch file to the accounting service backend 1740, which processes the batch to generate records for the bookkeeping account that correspond to the reported transactions in the received feed file. Additional details of example processes are discussed in more detail below.

Overview of Example Financial Services

According to one example, there is provided a method and a system for establishing links to bank accounts automatically and for providing a number of complementary services. The example method and system may include three parts, namely:

Automated provisioning of accounts via Internet banking.
Bank-provided services called by the accounting software system via a private application programming interface (API).
Delivery of file data via secure transfer (e.g., Account Feed Service).

Automated provisioning, according to one example embodiment, enables a mutual customer to establish a connection between the accounting software system and the financial institution. This may be achieved by allowing a financial institution customer to opt to make their feeds from their bank accounts available to the accounting software system within financial Internet software (e.g., hosted and operated by the customer's financial institution). Once a customer selects the bank account they want to share with the accounting software system, they are passed over to the accounting software system to link the selected bank account with an account they have set up in the accounting software system.

Once these accounts are connected, the accounting software system will register the feed via a private API with the financial institution and request the data to be included in a periodic data feed (e.g., a nightly feed).

If the connected account supports it, and the customer has requested the service, the customer can also pass payment instructions back from the accounting software system into Internet banking software of a financial institution for authorization. A variety of services provided by Internet banking software may be connected with the accounting software system.

Example of Automated Provisioning

Automated provisioning, according to an example embodiment, may include multiple functions, two of which are:
The activation/deactivation of services on the financial institution account for use with the accounting software system.
The management (e.g., mapping) of the financial institution accounts against accounts in the accounting software system.

Activation is the process of a user identifying, within Internet banking software, which of their bank accounts they would like to share with the accounting software system. All accounts may be deactivated by default. An authenticated user of online services may be required to explicitly activate accounts that are to be used with the accounting software system, and optionally select any additional services that they want to use. For example, the UI 800 may be used to activate accounts.

Once an account is activated, statement data relating to the account is marked as pending for batched retrieval to the accounting software system, which will later be confirmed by an "UpdateRegistration" service, further details of which are provided below.

Example of Management of Accounts

Once a financial institution account is activated, it can then be connected. Services are not fully enabled against the accounting software account until the financial institution account is connected and the feed registration confirmed.

An authenticated Internet banking user may opt to connect one or more activated accounts. From here, the user is redirected to the accounting software system, which will request the user to authenticate with the accounting software system (e.g., by use of the UI 900). After authentication, the user may be requested to select which bookkeeping accounts of the accounting software system they would like to connect their bank accounts that the financial institution (e.g., as shown in FIG. 17).

Once a bank account with the feed service is connected to an accounting software system account, the accounting software system will call the "UpdateRegistration" service. The service registers the account, allowing the latest data for this account to be retrieved on a schedule and loaded into the accounting software system account via a feed. The accounting software system processes the feed data from the financial institution to create or suggest corresponding entries in the single-ledger accounting system. For example, suggested entries can be presented to a user to confirm or modify before the entries in the single-ledger accounting system are created.

When a bank account providing a third party payment service is connected to an accounting software system account, batch payments can be submitted directly to the bank for approval from this account, using the third party payment service.

Account activation, according to one example embodiment, is a method for the assignation of available accounting software system services against the financial institution accounts. All accounts may be deactivated by default.

A single method, UpdateASServices, can take a map of accounts and requested accounting system (AS) services and update the active AS services against all of the user's accounts. This method (UpdateASServices) updates the AS services activated against a user's set of the financial institution accounts. For example, an execution of UpdateASServices on the financial system server may cause the transmission of data for each of the user's accounts to the requesting AS. The data may be incremental (e.g., reflect only changes since the last data transmission) or complete. Activation may occur within the financial institution's services platform. An authenticated online services user can change the activation status of their financial institution accounts.

A user is presented with a list of accounts available in their online services. Each account has a list of available services that that user can activate against each account. Term deposits may have no services available, credit cards may have Account Feed Service available, and current accounts may have the Account Feed Service and Third Party Payment Service available, depending on which accounts are capable of supporting feeds or batch payments.

Upon making changes to the services against accounts, a map of accounts and services requested to be activated against them are posted to the server. If there are terms and conditions that may be agreed to before data can be shared, such agreement may be obtained before the changes are committed.

Activation creates or assigns a unique identifier for the account (e.g., an AccountID), which is used for all services, and also when connecting the account to an accounting software system account. An AccountID is guaranteed to be unique and to persist, and is always the same for a given account (e.g., even if it's disconnected and reconnected). An AccountID may be included in the feed of transactions and may be allowed in the payment batch file format as the primary key. The AccountID may be an identifier that is already in use at the financial institution (including the account number), but security concerns recommend against using a credit card number or sensitive information as the AccountID.

Activation may be performed by a user authenticated by the financial institution with access to presented accounts. The new map of activated AS services may be saved against the user's list of accounts—assigning new AS services and deactivating ones that have been removed.

No service is activated against an account unless those services are listed within the account's available AS services. If an account has had the Account Feed Service added as part of the update, it is marked as pending for inclusion in the nightly batch file. If an account has had the Account Feed Service removed as part of the update, it is removed from the batch file. If this is the first time an account has been activated, a unique AccountID is assigned or generated.

Account connection and disconnection is handed over to the accounting software system to complete. For example, transfer to the accounting software system may be done via an HTTPS POST, triggered by the user from within the online financial software.

In some embodiments, the online financial customer clicks submit and the form post is intercepted, an AJAX request retrieves the above information in encrypted form and inserts it into the form's variables, the form is then posted. In order to complete the connection or disconnection, the user authenticates with the accounting software system with a valid user account.

Example Data Structures and Algorithms

Described next is the format, according to an example embodiment, of the data transferred from the financial institution to the accounting software system via the user's browser, when initiating or managing account feeds.

The data transferred may be sent from the financial institution to the accounting software system. The data may be transferred via the user's web browser client, as an encrypted, signed binary large object (BLOB) contained within a JavaScript object notation (JSON) data structure.

The financial institution assembles a BLOB of data (e.g., the AccountMapMessage, discussed in more detail below) containing information about the bank accounts that the user has opted to connect to the accounting software system. This BLOB will contain unique identifiers, account numbers, balances, and other sensitive information, and hence can be encrypted so the data within is opaque to the client browser transferring it.

The AccountMapMessage data may be transferred by first encrypting the data, and then generating a message authentication code (MAC) for the encrypted data. This may be referred to as the "encrypt then MAC" pattern. For example, a symmetric key is randomly generated, and used to encrypt the AccountMapMessage data. The financial institution, sending the data, has the accounting software system's public RSA key that they use to encrypt the symmetric key. The accounting software system, receiving the data, uses its private RSA key to decrypt the symmetric key and in turn uses it to decrypt the message.

The financial institution has a private RSA key that they use to sign messages sent to the accounting software system. The accounting software system uses the financial institution's public RSA key to verify that the signature is valid. In example embodiments, various cryptographic algorithms may be used, such as advanced encryption standard (AES) for symmetric encryption, the RSA algorithm (named after Ron Rivest, Adi Shamir, and Leonard Adleman) for asymmetric encryption, and the secure hash algorithm (SHA) RSA-SHA2 for signing.

For cryptographic keys generated and used in the system, minimum key sizes may be specified. For example, an AES or SHA key may be a minimum of 256 bits, and an RSA key may be a minimum of 2048 bits. Cryptographic systems may make use of nonce and initialization vector values. The nonce is a value used once for a particular message and then discarded. The nonce generation algorithm may ensure that the nonce is unique among messages sent with the same timestamp, unique among messages from the same party, or use another criterion for selection of the nonce. In one example embodiment, a random nonce is generated and compared to previously-used values. If the nonce is acceptable, it is used. If the nonce is not acceptable, a new random nonce is generated and the process is repeated.

An initialization vector is an input to the cryptographic system. Typically, the initialization vector is generated randomly. In some example embodiments, the initialization vector is generated using the nonce as an input to the initialization vector generation algorithm.

Nonce and initialization vectors may be generated from a cryptographically secure random number generator. This ensures that the symmetric encryption will be strong and prevent brute force attacks against the encrypted data byes in the message. As the generation of nonce and initialization vector is performed by the financial institution, the accounting software system may request confirmation of the method used in order to confirm that the generation process is sufficiently random.

For example, a number of default random number generators are not cryptographically secure. Instead, a cryptographically secure algorithm may be chosen (e.g. in C#, the System.Security.Cryptography.RandomNumberGenerator class should be used instead of the System.Random class).

Example data structures that may be used by the financial institution to implement the discussed cryptographic features include:

| Identifier | Description | Usage |
|---|---|---|
| FI_PrivKey | Financial institution's private key | A private RSA key issued and held only by the financial institution. |
| X_PubKey | The accounting software system public key | A public RSA key issued by the accounting software system. (Provided to financial institution by the accounting software system when the integration is set up) |

Example data structures that may be used by the accounting software to implement the discussed cryptographic features include:

| Identifier | Description | Usage |
|---|---|---|
| X_PrivKey | The accounting software system's private key | A private RSA key issued and held only by the accounting software system. |
| FI_PubKey | financial institution's public key | A public RSA key issued by the financial institution. (Provided to the accounting software system by financial institution when the integration is set up) |

The financial institution may use the following example algorithm to package a message for receipt by the accounting software system. In the pseudo-code below, the JSON AccountMapMessage containing the sensitive data is encrypted and signed, and then the resulting MessageContainer is sent to the accounting software system as a JSON data structure via the user's browser.

```
Plain TextDataString = Base64Encode(AccountMapMessage)
IVBytes = GenerateRandomIV( )
EncryptedIV = RSAEncrypt(IVBytes, X_PubKey)
RandomKeyBytes = GenerateRandomKey( )
EncryptedRandomKey = RSAEncrypt(RandomKeyBytes, X_PubKey)
EncryptedDataBytes = AESEncrypt(PlainTextDataString,
                                RandomKeyBytes, IVBytes)
```

```
SignatureBytes =           CalculateSHA2Signature(
                               EncryptedIV + EncryptedRandomKey +
                               EncryptedDataBytes,
                               FI_PrivKey)
MessageContainer.PC =      "PROVIDER/BANKXYZ"
MessageContainer.EIV =     Base64Encode(EncryptedIV)
MessageContainer.ERK =     Base64Encode(EncryptedRandomKey)
MessageContainer.Data =    Base64Encode(EncryptedDataBytes)
MessageContainer.S =       Base64Encode(SignatureBytes)
MessageContainer.SM =      "RSA-SHA2"
```

Verifying and unpackaging a message upon receipt by the accounting software system may be performed as follows. Upon the receipt of a message from the financial institution, the accounting software system may decrypt and unpack the message to ensure it has come from the financial institution, and has not been tampered with. The following algorithm, shown as pseudo-code, may be used to unpack the MessageContainer and receive the AccountMapMessage.

```
EncryptedIV =              Base64Decode(MessageContainer.EIV)
EncryptedRandomKey =       Base64Decode(MessageContainer.ERK)
EncryptedDataBytes =       Base64Decode(MessageContainer.Data)
SignatureBytes =           Base64Decode(MessageContainer.S)
(Check MessageContainer.SM == "RSA-SHA2")
VerifySignatureBytes =     CalculateSHA2Signature(
                               EncryptedIV + EncryptedRandomKey +
                               EncryptedDataBytes,
                               FI_PubKey)
(Check VerifySignatureBytes == SignatureBytes)
IVBytes =                  RSADecrypt(EncryptedIV, X_PrivKey)
RandomKeyBytes =           RSADecrypt(EncryptedRandomKey,
                               X_PrivKey)
PlainTextDataString =      AESDecrypt(EncryptedDataBytes,
                               RandomKeyBytes, IVBytes)
AccountMapMessage =        Base64Decode(PlainTextDataString)
```

The accounting software system may then validate the internals of the AccountMapMessage to check whether it has integrity. Validating the origin of the message may be performed by verifying that the Check AccountMapMessage.ProviderID matches MessageContainer.PC. Validating that the message is current may be performed by verifying that TimeStampUTC is within the tolerance for valid messages, and the message has not expired. Validating that the message is not a replay attempt may be performed by verifying that the (TimeStampUTC, Nonce) pair have not been used for this provider. Other validation of message contents may be performed.

If all of these verification and unpackaging operations succeed, then in certain embodiments, the user is shown screens allowing them to continue the activation process within the accounting software system.

The message encryption and packaging described above may be implemented to allow messages to pass from the financial institution to the accounting software system over an untrusted communication mechanism (e.g., over the Internet via the user's browser).

The encryption and signing may provide guarantees that the message was legitimately generated by the financial institution, not tampered with or viewed in transit, and cannot be replayed. The financial institution can also be assured that only the accounting software system will be able to decrypt the data. Various security threats are discussed in more detail below.

Spoofing: It is not possible for anyone other than the financial institution to generate a valid message, due to the use of the public/private key pair shared between the accounting software system and the financial institution.

Repudiation: The financial institution signs the data using their private key, which is kept secret and held only by them. When the accounting software system receives the message and checks the signature using the financial institution's public key, they can be assured that the financial institution originally generated the message.

Tampering: The signature check also prevents tampering in transit. If the IV, key or data is altered, then the signature check will fail.

Information Disclosure: The AccountMapMessage may contain some sensitive information, such as bank account balances or account numbers. This is encrypted using a one-time-use encryption key. The encryption key is transmitted in the message, but is encrypted asymmetrically using the accounting software system's public key, which only the accounting software system can decrypt.

Replay: Replay attacks are prevented by a timestamp and nonce value, which allows the accounting software system to guarantee it will receive and process a given message only once. If a message arrives with the same timestamp and nonce, the accounting software system will reject the message.

Man-in-the-middle: It is possible for an attacker to intercept the generated JSON from the financial institution, and forward it to the accounting software system before the legitimate user is able to. This is mitigated by SSL/TLS connections being used in the user's browser, preventing MiTM on the client side, and the use of a short expiration against the message timestamp. As the user is not required to perform any action between the message generation and the immediate POST to the accounting software system, the expiration can be kept short.

Denial of Service: This protocol does not provide protection against denial of service—an attacker could send large, malformed, or numerous messages to the accounting software system endpoint and incur a costly signature check or decryption process to occur. This will be mitigated by using the accounting software system's standard brute force detection mechanisms.

Elevation of Privilege: The message transferred from the financial institution to the accounting software system does not convey privileges from one environment to the other. The user still has to authenticate independently with both the financial institution's site and with the accounting software system.

Financial Institution Data Examples

Data provided by the financial institution may indicate an account type for each financial account of the user. For example, the C# class below can be used to implement an account type indicator. Similarly, the JSON example below may be used to indicate that an account is a current account. Sample C# class:

```
public enum AccountType
{
    CreditCard = 1,
    Current = 2,
    Savings = 3,
    Loan = 4,
    Investment = 5,
    Foreign = 6,
    Other = 7,
}
```

Sample JSON value:

```
{
    "AccountType": 2
}
```

Data provided by the financial institution may indicate one or more services provided for each financial account of the user. For example, the C# class below can be used to implement a service type indicator. Similarly, the JSON example below may be used to indicate that both an account feed service and a third party payment service are available for an account.

Sample C# class:

```
public enum ASService
{
    AccountFeedService = 1,
    ThirdPartyPaymentService= 2,
}
```

Sample JSON value:

```
{
    "ServicesAvailable": [
        1,
        2
    ]
}
```

Data stored at the AS system can reflect information about a financial account at the financial institution, including services available for that financial account. Below is a table of data types and descriptions for values that can be used in a C# class to store such account-specific data.

| Name | Type | Description |
| --- | --- | --- |
| AccountID | String(50) | Financial institution's account identifier. Globally unique. |
| AccountNumber | String(50) | Financial institution's supplied account number. Masked to last 4 digits if credit card PAN. |
| AccountDescription | String(50) | Financial institution's supplied account description. |
| ServicesAvailable | ASService (0 . . . 1) | The services that can be activated on this account. |
| ServicesActivated | ASService (0 . . . 1) | The services that are activated on this account. |
| CurrentBalance | Signed Decimal | Financial institution's supplied account balance. |
| AccountType | AccountType | The type of account. |
| Currency | Char(3) | ISO4217 currency code for the account. |

Sample C# class:

```
public class ActiveAccountServiceMap
{
    public string AccountID;
    public string AccountNumber;
    public string AccountDescription;
    public ASService[ ] ServicesAvailable;
    public ASService[ ] ServicesActivated;
    public decimal CurrentBalance;
    public AccountType AccountType;
    public string Currency;
}
```

Sample JSON value:

```
{
    "AccountID": "1123451111111100",
    "AccountNumber": "1123451111111100",
    "AccountDescription": "My Current Account",
    "ServicesAvailable": [
        1,
        2
    ],
    "ServicesActivated": [
        1
    ],
    "CurrentBalance": 213.97,
    "AccountType": 2,
    "Currency": "NZD"
}
```

Another example data type is the AccountMapMessage, containing the complete message indicating activated accounts to be sent from the financial institution to the accounting software system.

| Name | Type | Description |
| --- | --- | --- |
| ProviderID | String(50) | Accounting system's identifier for the financial institution |
| UserID | String(50) | Identifier that is unique to the online services user. |
| ActiveAccountServiceMaps | ActiveAccountServiceMap (1 . . . *) | A list of maps, each containing details for one account at the financial institution. |
| TimestampUTC | DateTime (e.g. "2000-12-29T00:00:00Z") | The time that the message was constructed by the caller. Used to expire messages that have passed a timeout threshold. |
| Nonce | String(255) | The Nonce value should be unique for all requests with that TimestampUTC. The nonce allows the server to verify that a request has never been made before and helps prevent replay attacks. The server will cache all (ProviderID, TimestampUTC, Nonce) tuples until after the expiration of the messages, and reject any un-expired messages that have already been received. |

| Name | Type | Description |
|---|---|---|
| ReturnURL | String(255) (well-formed absolute url) | A url to redirect the user to, upon completion of the mapping process. If absent/null, then the user will remain on the accounting software system website. Non-null urls must begin with http or https://, use the default port, and may be checked against a list of valid domain names for the provider bank. |

Sample C# class:

```
public class AccountMapMessage
{
    public string ProviderID;
    public string UserID;
    public ActiveAccountServiceMap[ ] ActiveAccountServiceMaps;
    public DateTime TimestampUTC;
    public string Nonce;
    public string ReturnURL;
}
```

Sample JSON value:

```
{
    "ProviderID": "PROVIDER/BANKXYZ",
    "UserID": "user@bank",
    "ActiveAccountServiceMaps": [
        {
            ...
        },
        {
            ...
        }
    ],
    "TimestampUTC": "2012-12-10T00:00:00",
    "Nonce": "A7813747-C47A-496E-8DE6-682D16A457D2",
    "ReturnURL": "https://www.xyz.com/"
}
```

Another example data type is the MessageContainer, containing the message that is sent from the financial institution to the accounting software system via the user's browser. Each Byte[ ] is transmitted as a Base 64 encoded string when rendered as JSON.

| Name | Type | Description |
|---|---|---|
| PC | String(50) | The accounting software system's identifier for the financial institution |
| Data | Byte[ ] | An encrypted blob of data |
| ERK | Byte[ ] | Encrypted Random Key<br>The key used to encrypt/decrypt the data blob. Should be encrypted with the accounting software system's public key. |
| EIV | Byte[ ] | Initialization Vector used when encrypting data. Should be encrypted with the accounting software system's public key. |
| S | Byte[ ] | The signature calculated when running the request signing method over the Encrypted IV, Encrypted Random Key and Data fields. |
| SM | String(50) | The method used to calculate the message signature. If not specified, the default of "RSA-SHA2" is assumed. |

Sample C# class:

```
public class MessageContainer
{
    public string PC;
    public byte[ ] Data;
    public byte[ ] ERK;
    public byte[ ] EIV;
    public byte[ ] S;
    public string SM;
}
```

Sample JSON value:

```
{
    "PC": "PROVIDER/BANKXYZ",
    "Data": "qas43 . . . ==",
    "ERK": "Rxut. . . ==",
    "EIV": "QEDF . . . ==",
    "S": "zyw . . . ==",
    "SM": "RSA-SHA2"
}
```

(Base 64 encoded values elided)

Example of User Account Management

Once the user has been redirected from the financial institution to the accounting software system, and the appropriate information passed, the accounting software system can associate each AccountID with a user's accounting software system account. If an account is connected, then the active AS services are provided to that account.

The user can manage accounts that have already been connected. In this case, they can be shown the status of the connection and be enabled to disconnect the accounts if they wish. If an account is disconnected, then the active AS services are removed from that account.

In embodiments, prior to allowing a user to manage an account, one or more of the following preconditions is verified.

The user is authenticated with the accounting software system.

The ProviderCode is recognized.

The random key can be decrypted with the accounting software system's private key.

The request data can be decrypted with the random key.

The signature is verified with financial institution's public key.

The ProviderID is a valid provider.

The nonce has not been used before.

The data is able to be parsed and all required elements are included.

At least one AccountServiceMap with an Active Service is included in the list of ActiveAccountServiceMaps.

The timestamp is within a valid timeout period.

Example Private Financial API

In some embodiments, in order for the accounting software system to share services with the financial institution, the financial institution exposes a number of services to the accounting software system. These allow the accounting software system to perform actions against the financial institution when instructed by the customer. Additional services may also be supported.

The financial institution may implement a small web service that accepts and responds to JSON POST requests. The specifications for expected requests and responses are below.

Access to the financial services endpoint may be secured by VPN and usable only by the accounting software system. The complete URL for the service is unique to the providing financial institution, but the endpoints may be the same for all participating financial institutions. Example endpoints are given below with each service.

With respect to third party payments, once the financial institution account has been activated and connected with a third party payment service, a batch payment against that account can be submitted to the financial institution. If an account has the third party payment service against it, when an accounting software system user creates a batch payment as part of their management of accounts payable, they have the option to directly submit that batch to the financial institution for authorization and completion.

A representational state transfer (REST) architecture may support a RESTful interface between a client and a server. The RESTful interface may be stateless (e.g., no client context may be stored on the server between requests). The RESTful interface may be cacheable (e.g., responses from the server may indicate if they are cacheable). A client may cache the cacheable responses, reducing network traffic and latency. The RESTful interface may be layered (e.g., the client may connect to an intermediate server rather than an end server). The RESTful interface may identify the resources involved in each request in order to allow the client to modify the resources it possesses. Furthermore, in a stateless RESTful interface, each REST message may be self-contained and include enough information to describe how to process the message. Some clients may track their own state and make state transitions only through hypermedia (e.g., hyperlinks).

The third-party payment request may be a RESTful HTTP request that posts a JSON message and expects a JSON response. The format of example JSON requests and responses are provided below.

Third Party Payment Request—Request that a payment or batch of payments be made from an account of the user to a third party. The request is made by the AS to the financial institution. In some example embodiments, the bank executes the payment based on the payment request, without further intervention from the account holder. In other example embodiments, after receiving the payment request from the accounting application, the bank holds the payment for authorization from the account holder. For example, the bank may present a list of requested payments to the account holder via a mobile application or web interface, and execute the payments only after receiving an authorization from the account holder.

Endpoint: /thirdpartypayment

Each item in a batch describes a single transaction. Example elements of a batch item:

| Element Name | Type | Description |
| --- | --- | --- |
| AccountNumber | String(20) | This is the account number for the account to which the payment is being made. |
| Amount | Signed Decimal | This represents the amount of payment being made to the recipient account. |
| Name | String(50) | Name of the Payee |
| Particulars | String(50) | These are the Particulars, Code and Reference details pertaining to the payment recipient account AccountNumber. These values may be used by the financial institution. |
| Code | String(50) | |
| Reference | String(50) | |

Example Elements of a Third Party Payment Request:

| Element Name | Type | Description |
| --- | --- | --- |
| ProviderCode | String(50) | Name of the provider (e.g. "Xero") |
| UserID | String(50) | This is the financial institution's customer number/unique identifier for the user making the payment. The UserID was passed to the accounting software system through the linking service. |
| AccountID | String(20) | This is the financial institution's account ID for the account from which the payment is made. The AccountID was passed to the accounting software system through the linking service. |
| FromParticulars | String(50) | These are the Particulars, Code, and Reference details pertaining to the AccountID, for use by the financial institution. |
| FromReference | String(50) | |
| FromCode | String(50) | |
| PaymentDate | Date | The date the payment is due to go out of the 'FromAccount'. It should adhere to ISO 8601. |
| BatchItems | Array (1 . . . *) | Array of batch items that construct the payment batch including at least one element. A single payment will be an array of one element. |
| TotalAmount | Signed Decimal | This is the total of the Amount fields of the payment line items contained within the payment batch. |

Sample Request:

Header:

POST /thirdpartypayment

Content-Type: application/json

Message:

```
{
    "ProviderCode" : "Xero",
    "UserID" : "12312323",
    "AccountID" : "060158390390200",
    "FromParticulars" : "PayerName",
    "fromReference" : "PayerReference",
    "fromCode" : "PayerCode",
    "PaymentDate" : "2012-12-13",
    "BatchItems" : [
        {
            "AccountNumber" : "040932093021903",
            "Amount" : "323.00",
            "Name" : "Payee",
```

```
        "Particulars" : "PayeeName",
        "Reference" : "PayeeReference"
        "Code" : "PayeeCode",
        }
    ],
    "TotalAmount" : "323.00",
}
```

Third Party Payment Response—The financial institution provides a response to the third party payment request.

The response returns HTTP status to report the success of the request. If there is a server error, the message will include a JSON packet that contains a non-empty array of error messages. The batch should be processed in full, returning a 200 status, or not processed at all, returning a 500 error and the relevant error messages.

Example Elements of an Error Message Type:

| Element Name | Type | Description |
| --- | --- | --- |
| ErrorMessage | Array of String(250) | Error message details provided by the financial institution. These are then displayed as 'error notifications' to the accounting software system user so should be user readable. |

Sample Response:

Header:

HTTP/1.1 200 OK

Sample Error Response:

Header:

HTTP/1.1 500 Server Error

Message:

```
{
    "ErrorMessage": [
        "Human readable error message",
        "Can be multiple lines"
    ],
}
```

Update Registration Request—Request to update the registration data at the financial institution for an account already registered. The request is made from the accounting software system to the financial institution. Updating the registration data for a financial account may include registering a feed for the account with the bank, disconnecting the financial account from the corresponding the accounting software system account, or otherwise changing the registration of the account.

The accounting software system may implement a periodic job to identify disconnected accounts and verify that they meet certain criteria (e.g., time period for which they have been disconnected, etc.), prior to updating their status to show that they have been deregistered. The requests may be submitted in a batch.

Endpoint: /updateregistration

Each item in a batch request indicates a single account to update. Example elements of a request for update of a single account:

| Element Name | Type | Description |
| --- | --- | --- |
| UserID | String (50) | Financial institution's customer number/unique identifier. |
| AccountId | String (50) | Financial institution's account identifier. Unique within the financial institution. |
| AccountStatus | String (50) | Valid values are "Register" or "Deregister". Indicates whether an account's data should be included in the nightly feed provided to the accounting software system. Typically an account will be registered once connected to the accounting software system account, and deregistered on customer instruction, on the deletion of their subscription or if they have been removed from an organisation. |

Example Elements of an Update Registration Request:

| Element Name | Type | Description |
| --- | --- | --- |
| ProviderCode | String(50) | Name of the provider (e.g. "Xero") |
| AccountsToUpdate | Array(1 . . . *) | Array of accounts that will be registered or deregistered for feeds |

Header:

POST /updateregistration

Content-Type: application/json

Message:

```
{
    "ProviderCode" : "Xero",
    "AccountsToUpdate" : [
        {
            "UserID" : "234324324",
            "AccountID" : "23432432432",
            "AccountStatus" : "Register"
        }
    ]
}
```

Update Registration Response—The financial institution provides a response to the Update Registration Request. Additionally, upon receiving a registration or deregistration request, the financial institution may add or remove the account from the list of accounts used in the feed provided to the accounting software system.

The update registration request may be processed in full, returning a 200 status, or not processed at all, returning a 500 error and the relevant error messages for the accounts that could not be registered or deregistered.

Example Elements of an Error Response from the Financial Institution:

| Element Name | Type | Description |
| --- | --- | --- |
| UserID | String(50) | This is the financial institution's customer number/unique identifier |

| Element Name | Type | Description |
|---|---|---|
| AccountID | String(50) | Financial institution's Account identifier. Unique within the financial institution. |
| ErrorMessage | Array of String(250) | Error message details provided by the financial institution. |

Sample Success Response:
Header:
   HTTP/1.1 200 OK
Sample Error Response:
Header:
   HTTP/1.1 500 Server Error
Message:

```
{
  "ErrorResults": [
    {
      "UserID" : "234324324",
      "AccountId" : "23432432432",
      "ErrorMessage" : [
        "Human readable error message",
        "Can be multiple lines"
      ]
    }
  ],
}
```

Other Data Types

The table below contains additional data types that are used in various embodiments at either or both of the accounting service and the financial institution.

| Name | Source | Type | Description |
|---|---|---|---|
| ASService | Shared | Enum | Indicates a type of service, such as AccountFeed or ThirdPartyPayment. |
| AccountType | Shared | Enum | Indicates a type of account such as CreditCard, Current, Savings, Loan, Investment, Foreign, or Other. |

The table below contains additional data that is used in various embodiments at the financial institution.

| Name | Source | Type | Description |
|---|---|---|---|
| | | Global | |
| ProviderCode | Accounting System | String(50) | Used so that accounting software can recognize partner before decryption. |
| ProviderID | Accounting System | String(50) | Used so that the accounting software system can confirm recognition of partner after decryption. |
| FI Private Key | Financial Institution | Byte[ ] | Private key of the financial institution for encryption/decryption. |
| AS system Public Key | Accounting System | Byte[ ] | Public key of the AS system for encryption/decryption. |
| | For each financial institution user | | |
| UserID | Financial Institution | String(50) | Identifier that is unique to the online services user. |
| Accounts | Financial Institution | Account (0 . . . *) | All accounts the user has access to. |
| | For each financial institution account | | |
| AccountID | Financial Institution | String(50) | Should be unique to account, persistent to user, even if disconnected/reconnected. Should be used when connecting and in nightly feed file. Will be used to submit batch payments. |
| MaskedAccountNumber | Financial Institution | String(50) | Credit card numbers should be masked up until the last four digits. |
| Account Description | Financial Institution | String(50) | Description for the account. |
| ServicesAvailable | Financial Institution | ASService (0 . . . *) | The services that can be activated on this account. |
| ServicesActivated | Financial Institution | ASService (0 . . . *) | The services that are activated on this account. |
| CurrentBalance | Financial Institution | Signed Decimal | Balance of the account |
| AccountType | Financial Institution | AccountType (1) | The type of account |
| Currency | Financial Institution | Char(3) | ISO standard currency code for account balance (ISO 4217) |

The table below contains additional data that is used in various embodiments at the accounting system.

| Name | Source | Type | Description |
|---|---|---|---|
| | | Global | |
| Providers | Accounting System | Providers (1 . . . *) | Used so that the accounting software system can recognize partner before decryption. |
| FI Public Key | Financial Institution | Byte[ ] | The public key of the financial institution for encryption/decryption. |
| AS Private Key | Accounting System | Byte[ ] | The private key of the accounting system for encryption/decryption. |
| | For each financial institution | | |
| ProviderCode | Accounting System | String(50) | Used so that the accounting software system can recognize partner before decryption. |
| ProviderID | Accounting System | String(50) | Used so that the accounting software system can confirm recognition of partner after decryption. |
| | For each financial account | | |
| AccountID | Accounting System | GUID | Accounting software system's account identifier |
| ProviderAccountID | Financial Institution | String(50) | Financial institution's account identifier |
| ProviderAccountNumber | Financial Institution | String(50) | Financial institution's supplied account number |
| ProviderAccountDescription | Financial Institution | String(50) | financial institution's supplied account description |

-continued

| Name | Source | Type | Description |
|---|---|---|---|
| ProviderServices Activated | Financial Institution | ASService (0 ... *) | financial institution's supplied account's activated services |
| ProviderCurrent Balance | Financial Institution | Signed Decimal | financial institution's supplied account's balance |
| ProviderAccount Type | Financial Institution | AccountType | financial institution's supplied account's type |
| ProviderCurrency | Financial Institution | Char(3) | financial institution's supplied account's currency |

Example Account Feed Service with File Delivery

Batched Supply of Statement Data

The financial institution can submit data to the accounting software system in a batch. In some embodiments, the financial system verifies that each account has been activated, registered, and confirmed prior to adding data for the account to the batch.

The financial institution may post the latest transactions for all active and confirmed accounts via a periodic (e.g., nightly) batch file over secure file transfer protocol (SFTP). The batch contains statement data for all accounts that are marked as activated, or a subset thereof. The batch file may be keyed by AccountID. If the accounting software system encounters an AccountID that is not recognized (e.g., activated but not connected), the data is ignored. Otherwise the data is loaded into the accounting software system account associated with that AccountID. The accounting software system processes the feed data from the financial institution to create corresponding entries in the single-ledger accounting system.

Example Processes

Figure 18:
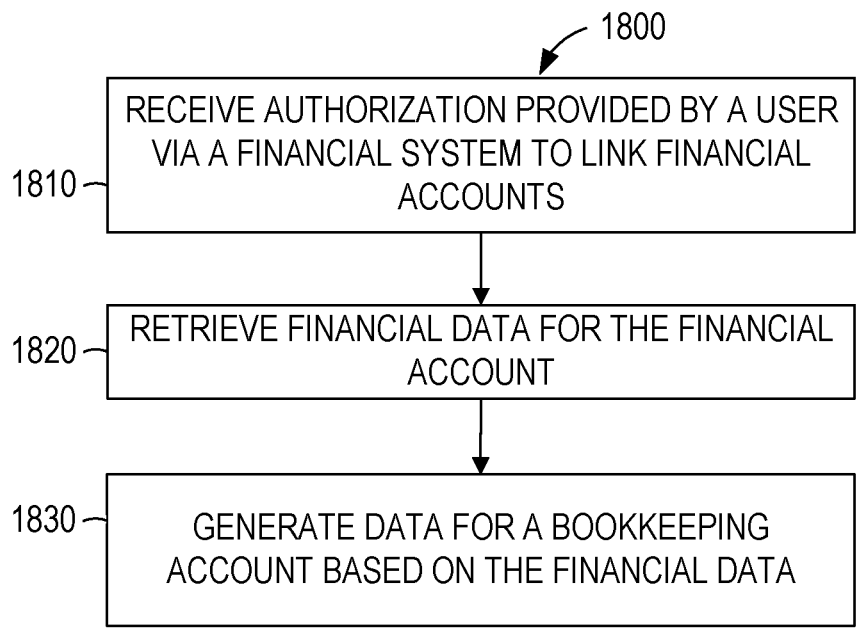
FIG. 18 is a flowchart of an example method for access control and system integration, according to some embodiments.

FIG. 18 is a flowchart of an example method 1800 for access control and system integration, according to some embodiments. The method 1800 is described as being implemented by systems and modules of FIGS. 5-7, by way of example.

The communication module 610 of the app server VM 320 receives, in operation 1810, an authorization provided by a user via a financial system to link one or more financial accounts. For example, the bank server 460 may have communicated a web page to the client device 480 or 490, such as the example UI 800 shown in FIG. 8. Using the UI, the user may have selected one or more accounts to share with the accounting platform. After receiving the selection by the user, the bank server 460 sends the authorization to the accounting server.

In operation 1820, the accounting platform retrieves financial data for the financial account. For example, the bank server 460, using the feed module 730, can generate a file containing transactions for the financial account and transfer the file to the app server VM 320. The app server VM 320 can store the feed data for later processing in a database or file system via the storage module 660. The feed module 630 of the app server VM 320 may then retrieve the financial data for the financial account from storage. In other embodiments, the accounting platform retrieves the financial data directly from the financial institution.

In operation 1830, the feed module 630 generates data for a bookkeeping account based on the financial data. For example, a transaction in the financial data may show a payment to an entity on a date and a corresponding transaction for the bookkeeping account can be generated.

Figure 19:
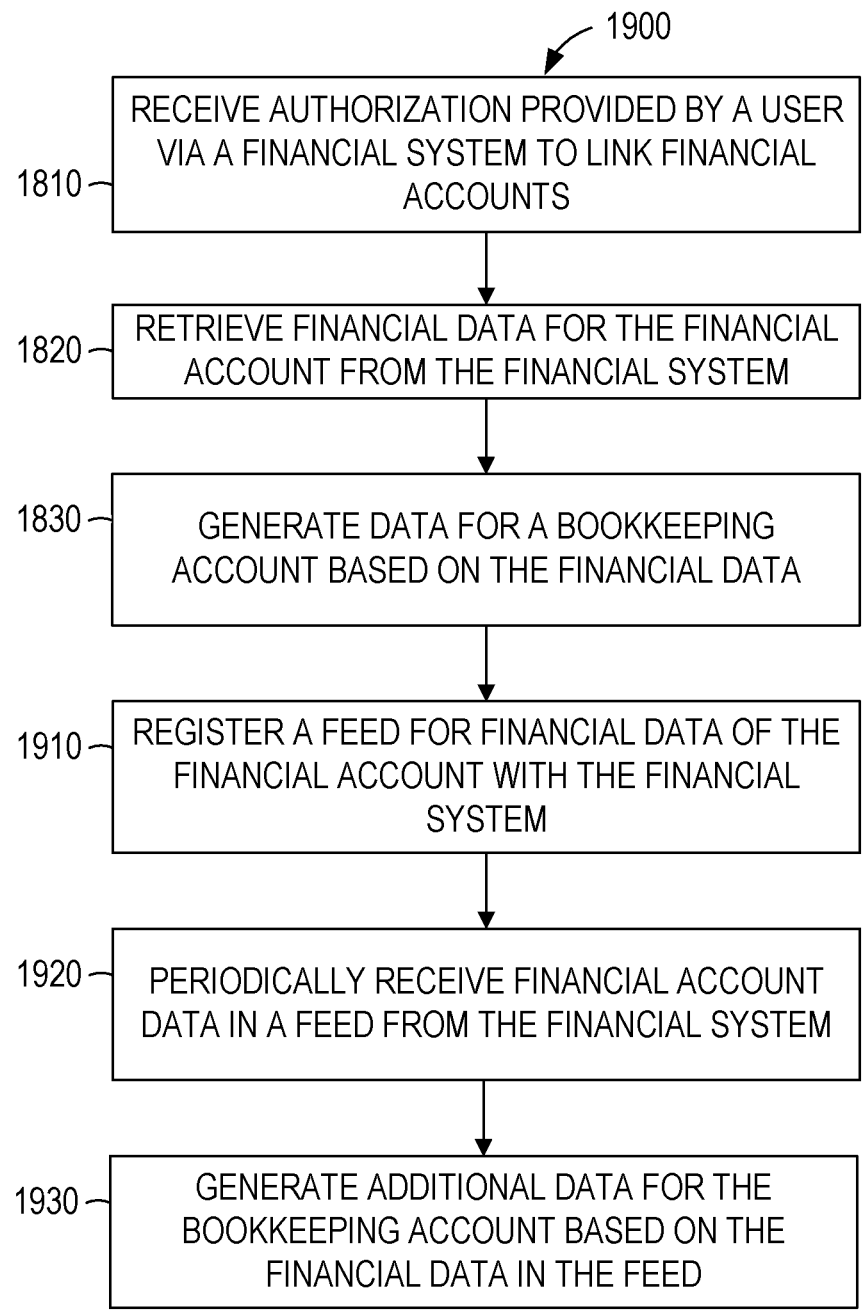
FIG. 19 is a flowchart of an example method for access control and system integration, according to some embodiments.

FIG. 19 is a flowchart of an example method 1900 for access control and system integration, according to some embodiments. The method 1900 is described as being implemented by systems and modules of FIGS. 5-7, by way of example. Operations 1810-1830 are described above with respect to FIG. 18.

The accounting platform registers, in operation 1910, a feed for financial data of the financial account within the financial system. For example, the accounting platform can send, via the communication module 610, using secure encrypted messages processed with the cryptography module 620, an identifier for the financial account along for which data is requested. In response, the bank server 460 can verify that the user owning the financial account already provided authorization to share the account data with the accounting platform. After confirming the authorization, the bank server accepts the registration and arranges to periodically send feed data to the accounting platform.

The accounting platform periodically receives the financial account data in a feed from the financial system (operation 1920) and generates additional bookkeeping data for the corresponding bookkeeping account (operation 1930) as new data is received.

Figure 20:
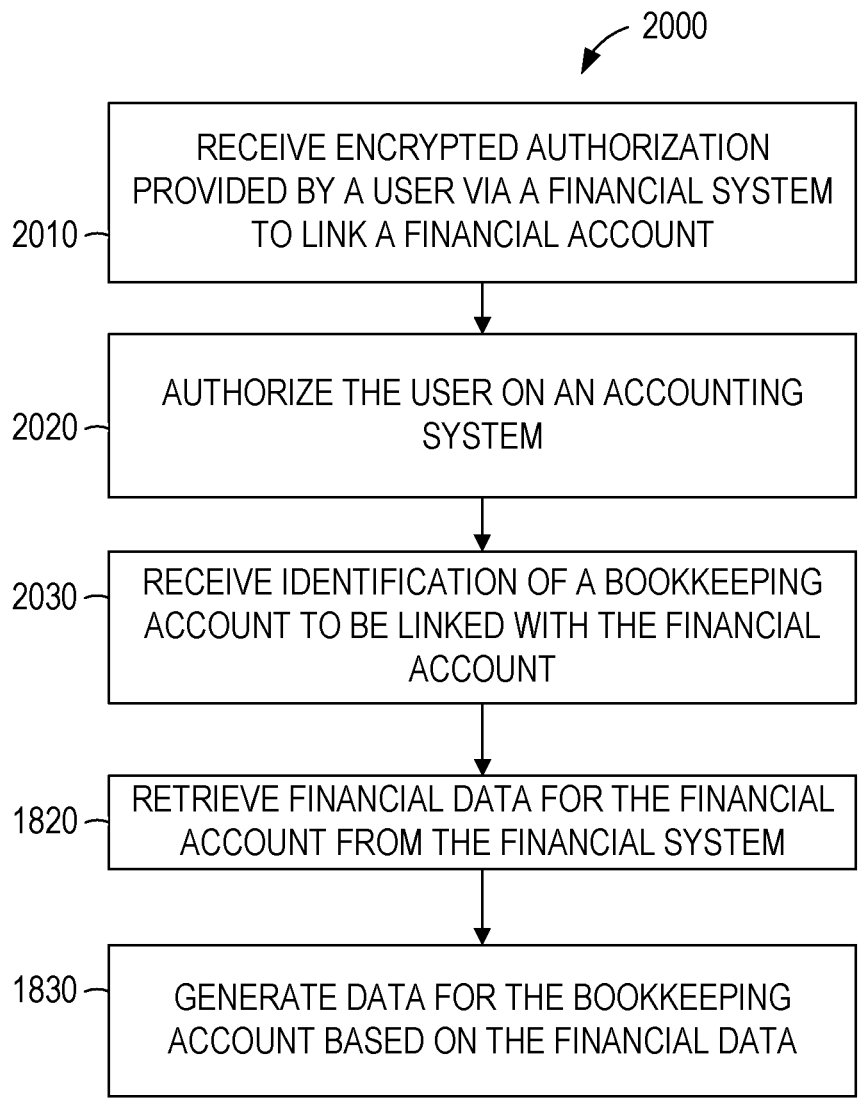
FIG. 20 is a flowchart of an example method for access control and system integration, according to some embodiments.

FIG. 20 is a flowchart of an example method 2000 for access control and system integration, according to some embodiments. The method is described as being implemented by systems and modules of FIGS. 5-7, by way of example only. Operations 1820 and 1830 are described above with respect to FIG. 18.

In operation 2010, the app server VM 320 receives an encrypted authorization provided by a user via a financial system to link financial accounts. For example, the client device 480 or 490 can establish a connection with the bank server 460 to authorize the sharing of account data with the accounting platform. In response, the bank server 460 can encrypt a message destined for the accounting platform to inform the accounting platform that the accounting platform has been authorized to receive account data for a financial account. The app server VM 320 can decrypt the message, using the cryptography module 620, and verify the source.

The accounting system authorizes the user (operation 2020). For example, the UI 900 can be presented by the display module 520 of the client device 480 connected to a web server of the primary data center 410. The user authorization may include a user name and password, biometric data, or otherwise identify the user as being the same as the user that authorized the linking of the financial account data.

The accounting system receives an identification of a bookkeeping account associated with the user to be linked with the financial account (operation 2030). For example, the UI 1000 may be presented to allow the user to select bookkeeping accounts to associate with the financial accounts.

Figure 21:
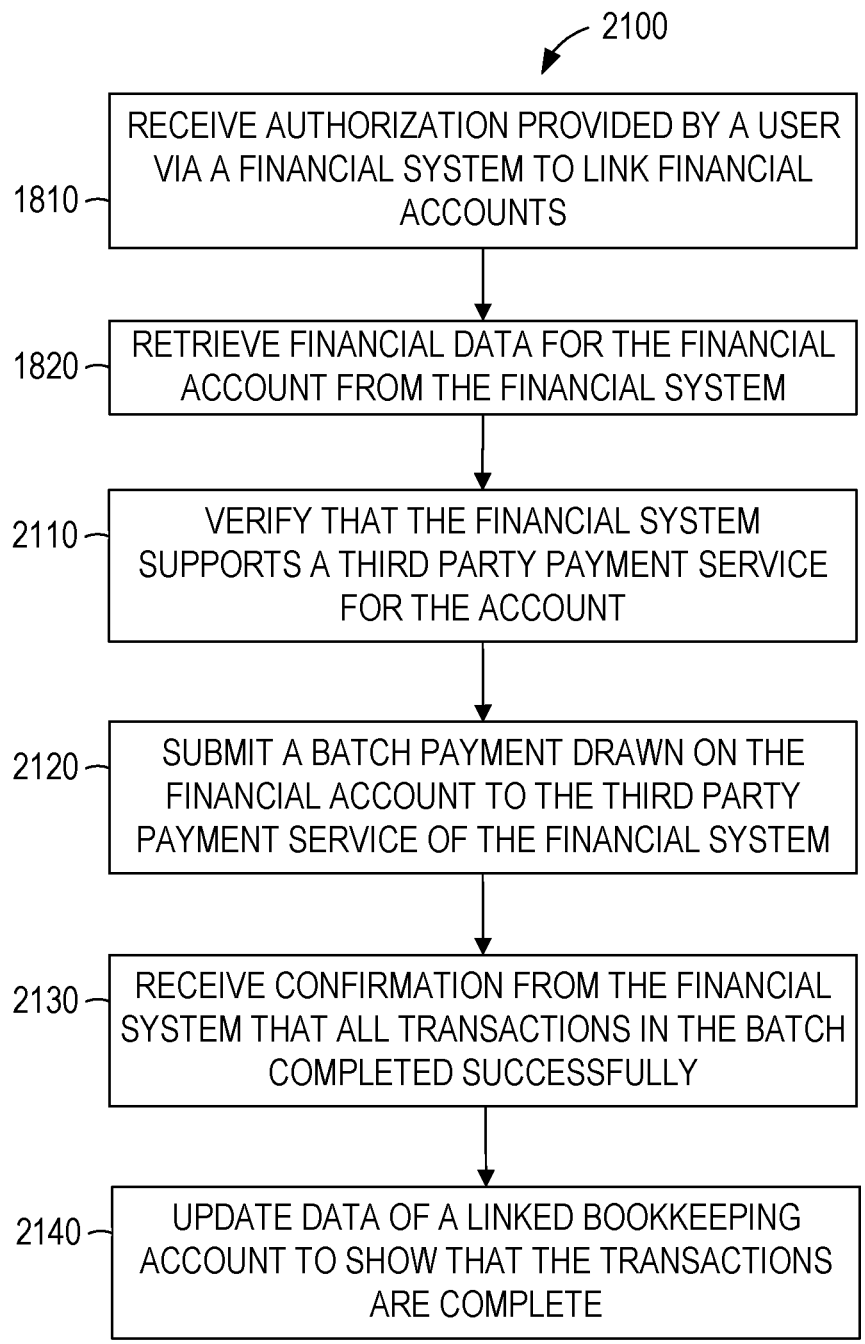
FIG. 21 is a flowchart of an example method for access control and system integration, according to some embodiments.

FIG. 21 is a flowchart of an example method 2100 for access control and system integration, according to some embodiments. The method 2100 is described as being implemented by systems and modules of FIGS. 5-7, by way of example only. Operations 1810 and 1820 are described above with respect to FIG. 18.

The accounting service provider verifies that the financial system supports a third party payment service for the linked financial account in operation 2110. This enables the user of the accounting platform to submit individual or batch payments to third parties via the financial system.

In operation 2120, a batch payment drawn on the financial account is submitted to the bank server 460 by the app server VM 320. For example, the user may select a set of bills to pay in a batch using the UIs shown in FIGS. 13-16, and the app server VM 320 may generate a batch payment file and automatically send the batch payment file to the bank server 460.

The bank server 460 processes the payments in the batch and determines if all payments were processed successfully. If so, the bank server 460 sends a confirmation to the accounting platform, which receives (operation 2130) the confirmation. If any payments were not processed successfully, all transactions are rolled back and an error message is supplied to the accounting platform. In that case, an error message is shown to the user by the accounting platform.

If the transactions completed successfully, the data of the bookkeeping account corresponding to the financial account is updated (operation 2140) to show that the transactions are complete. For example, new records may be created in the bookkeeping account to show the payments, the current balance of the bookkeeping account may be updated to reflect the transactions, the bills may be marked as paid, and so on.

Example Hardware Modules

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Computer System

Figure 22:
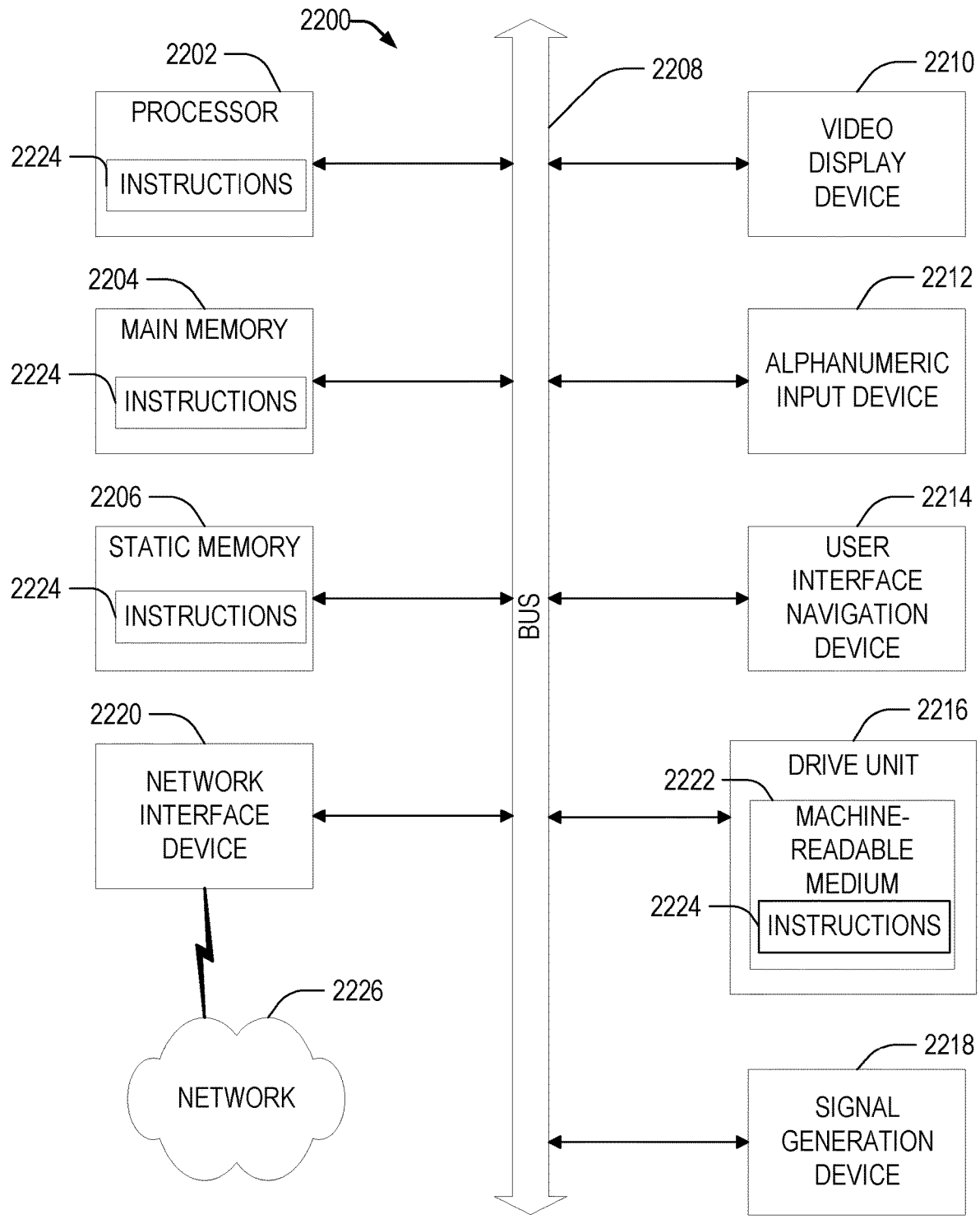
FIG. 22 is a block diagram of a machine in the example form of a computer system within which a set of instructions may be executed for causing the machine to perform any one or more of the methodologies discussed herein, according to some embodiments.

FIG. 22 shows a block diagram of a machine in the example form of a computer system 2200 within which instructions 2224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 2200 includes a processor 2202 (e.g., a central processing unit (CPU), a graphics processing unit (GPU) or both), a main memory 2204, and a static memory 2206, which communicate with each other via a bus 2208. Computer system 2200 may further include a video display device 2210 (e.g., a liquid crystal display (LCD) or a cathode ray tube (CRT)). Computer system 2200 also includes an alphanumeric input device 2212 (e.g., a keyboard), a user interface (UI) navigation device 2214 (e.g., a mouse or touch sensitive display), a disk drive unit 2216, a signal generation device 2218 (e.g., a speaker) and a network interface device 2220.

Disk drive unit 2216 includes a machine-readable medium 2222 on which is stored one or more sets of data structures and instructions 2224 (e.g., software) embodying or utilized by any one or more of the methodologies or functions described herein. Instructions 2224 may also reside, completely or at least partially, within main memory 2204, within static memory 2206, and/or within processor 2202 during execution thereof by computer system 2200, main memory 2204 and processor 2202 also constituting machine-readable media.

While machine-readable medium 2222 is shown in an example embodiment to be a single medium, the term "machine-readable medium" may include a single medium or multiple media (e.g., a centralized or distributed database, and/or associated caches and servers) that store the one or more instructions 2224 or data structures. The term "machine-readable medium" shall also be taken to include any tangible medium that is capable of storing, encoding or carrying instructions (e.g., instructions 2224) for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 2224 may further be transmitted or received over a communications network 2226 using a transmission medium. Instructions 2224 may be transmitted using network interface device 2220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising, at a data center of an accounting system:
   receiving, from a user of the accounting system, financial account credentials registered to a financial account at a financial institution, the financial institution storing banking records for the financial account at a bank server;
   allowing the user to establish an encrypted connection between the financial account at the financial institution and a user account associated with the user at the accounting system;
   in response to the user selecting to establish the encrypted connection between the financial account at the financial institution and the user account associated with the user at the accounting system:
      registering to receive, from the bank server, banking records for the financial account via a secure bank feed, via which secure bank feed up to date banking records for the financial account are transmitted in encrypted form from the bank server and, at the accounting system, decrypted and loaded into a user account of the accounting system associated with the user; and
      from the user account associated with the user at the accounting system, issuing, in encrypted form and via a communication module of the accounting system, one or more requests requesting a payment to the financial account at the financial institution.

2. The method according to claim 1, the method further comprising
   at the bank server, using a randomly generated symmetric key to encrypt the banking records, using a public key of the accounting system to encrypt the randomly generated symmetric key for transmission to the accounting system to process the payment from the financial account, and sending the encrypted banking records and the encrypted randomly generated symmetric key to the accounting system via the secure bank feed;
   at the accounting system, receiving, from the bank server via the bank feed, the encrypted banking records and the encrypted randomly generated symmetric key, using a private key to decrypt the encrypted randomly generated symmetric key, and using the decrypted randomly generated symmetric key to decrypt the encrypted banking records.

3. The method according to claim 1, further comprising
   receiving, from the user, an activation of a third party payment service to process the one or more requests for payment.

4. The method of claim 1,
   wherein a user application of the accounting system provides, to a user account of the accounting system, a user interface for enabling, for one or more financial accounts previously registered to the user account of the accounting system, the accounting system to register to receive a bank feed of banking records for the one or more financial accounts.

5. The method according to claim 4, further comprising
   authenticating the user with the financial institution to allow the user establish a connection between the financial account at the financial institution and a user account associated with the user at the accounting system.

6. The method of claim 1,
   wherein the up to date records for the financial account are transmitted from the bank server and loaded into the user account of the accounting system on a schedule.

7. The method of claim 1, further comprising
   at the accounting system, processing the banking records received via the secure bank feed to create or suggest corresponding entries in a single-ledger accounting system maintained by the accounting system in association with the user account.

8. The method according to claim 1, wherein
   the secure bank feed is composed of bank feed data regarding financial transactions to and from the financial account at the financial institution.

9. An accounting system comprising:
   a memory; and
   a processor coupled to the memory and configured to perform operations comprising:
      receiving, from a user of the accounting system, financial account credentials registered to a financial account at a financial institution, the financial institution storing banking records for the financial account at a bank server;
      allowing the user to establish an encrypted connection between the financial account at the financial institution and a user account associated with the user at the accounting system;
      in response to the user selecting to establish the encrypted connection between the financial account at the financial institution and the user account associated with the user at the accounting system:
         registering to receive, from the bank server, banking records for the financial account via a secure bank feed, via which secure bank feed up to date banking records for the financial account are transmitted in encrypted form from the bank server and, at the accounting system, decrypted and loaded into a user account of the accounting system associated with the user; and
         from the user account associated with the user at the accounting system, issuing, in encrypted form and via a communication module of the accounting system, one or more requests for payment to the financial account at the financial institution.

10. The accounting system of claim 9, wherein the operations further comprise:
  receiving, from the bank server via the secure bank feed, a randomly generated symmetric key encrypted by a public key of the accounting system, and banking records encrypted by the randomly generated symmetric key;
  using a private key to decrypt the encrypted randomly generated symmetric key, and using the decrypted randomly generated symmetric key to decrypt the encrypted banking records.

11. The accounting system of claim 9, wherein the operations further comprise:
  receiving, from the user, an activation of a third party payment service to process the one or more requests for payment.

12. The accounting system of claim 9, wherein a user application of the accounting system provides, to a user account of the accounting system, a user interface for enabling, for one or more financial accounts previously registered to the user account of the accounting system, the accounting system to register to receive a bank feed of banking records for the one or more financial accounts.

13. The accounting system of claim 12, wherein the processor is further configured to perform operations comprising:
  authenticating the user with the financial institution to allow the user establish a connection between the financial account at the financial institution and a user account associated with the user at the accounting system.

14. The accounting system of claim 9, wherein
  wherein the up to date records for the financial account are transmitted from the bank server and loaded into the user account of the accounting system on a schedule.

15. The accounting system of claim 9, wherein the processor is further configured to perform operations comprising:
  at the accounting system, processing the banking records received via the secure bank feed to create or suggest corresponding entries in a single-ledger accounting system maintained by the accounting system in association with the user account.

16. The accounting system of claim 9, wherein
  the secure bank feed is composed of bank feed data regarding financial transactions to and from the financial account at the financial institution.

17. A non-transitory machine-readable storage medium storing instructions thereon which, when executed by one or more processors of an accounting system, cause the accounting system to perform operations comprising:
  receiving, from a user of the accounting system, financial account credentials registered to a financial account at a financial institution, the financial institution storing banking records for the financial account at a bank server;
  allowing the user to establish an encrypted connection between the financial account at the financial institution and a user account associated with the user at the accounting system;
  in response to the user selecting to establish the encrypted connection between the financial account at the financial institution and the user account associated with the user at the accounting system:
    registering to receive, from the bank server, banking records for the financial account via a secure bank feed, via which secure bank feed up to date banking records for the financial account are transmitted in encrypted form from the bank server and, at the accounting system, decrypted and loaded into a user account of the accounting system associated with the user; and
    from the user account associated with the user at the accounting system, issuing, in encrypted form and via a communication module of the accounting system, one or more requests for payment to the financial account at the financial institution.

18. The non-transitory machine-readable storage medium of claim 17, wherein the operations further comprise providing a user application of the accounting system to one or more users:
  wherein the user application provides, to a user account of the accounting system, a user interface for enabling, for one or more financial accounts previously registered to the user account of the accounting system, the accounting system to register to receive a bank feed of banking records for the one or more financial accounts.

19. The non-transitory machine-readable storage medium of claim 17, wherein the operations further comprise:
  receiving, from the bank server via the secure bank feed, a randomly generated symmetric key encrypted by a public key of the accounting system, and banking records encrypted by the randomly generated symmetric key;
  using a private key to decrypt the encrypted randomly generated symmetric key, and using the decrypted randomly generated symmetric key to decrypt the encrypted banking records.

20. The non-transitory machine-readable storage medium of claim 17, wherein the operations further comprise:
  receiving, from the user, an activation of a third party payment service to process the one or more requests for payment.

* * * * *